United States Patent
Le et al.

(10) Patent No.: US 12,254,601 B2
(45) Date of Patent: Mar. 18, 2025

(54) APPARATUS AND METHOD FOR INTERBAND DENOISING AND SHARPENING OF IMAGES

(71) Applicant: Samsung Electronics Co., Ltd., Suwon-si (KR)

(72) Inventors: Long N. Le, Richardson, TX (US); Yibo Xu, Plano, TX (US); John W. Glotzbach, Allen, TX (US); Zhen Tong, Tallahassee, FL (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 17/586,435

(22) Filed: Jan. 27, 2022

(65) Prior Publication Data
US 2023/0034109 A1   Feb. 2, 2023

Related U.S. Application Data

(60) Provisional application No. 63/294,462, filed on Dec. 29, 2021, provisional application No. 63/222,187, filed on Jul. 15, 2021.

(51) Int. Cl.
*G06T 5/70* (2024.01)
*G06T 5/10* (2006.01)
*H04N 25/683* (2023.01)

(52) U.S. Cl.
CPC .......... *G06T 5/70* (2024.01); *G06T 5/10* (2013.01); *H04N 25/683* (2023.01)

(58) Field of Classification Search
CPC .... G06T 5/70; G06T 5/73; G06T 5/75; G06T 5/10
See application file for complete search history.

(56) References Cited

U.S. PATENT DOCUMENTS 8,108,211 B2   1/2012   Baqai et al.
8,253,832 B2   8/2012   Adams, Jr. et al.
(Continued)

FOREIGN PATENT DOCUMENTS

JP   2020-123864 A   8/2020
JP   2020-187611 A   11/2020
(Continued)

OTHER PUBLICATIONS

International Search Report and Written Opinion of the International Searching Authority dated Oct. 17, 2022 in connection with International Patent Application No. PCT/KR2022/010326, 9 pages.
(Continued)

*Primary Examiner* — Benjamin O Dulaney

(57) ABSTRACT

A method includes obtaining a blended red-green-blue (RGB) image frame of a scene. The method also includes performing, using at least one processing device of an electronic device, an interband denoising operation to remove at least one of noise and one or more artifacts from the blended RGB image frame in order to produce a denoised RGB image frame. Performing the interband denoising operation includes performing filtering of red, green, and blue color channels of the blended RGB image frame to remove at least one of the noise and the one or more artifacts from the blended RGB image frame. The filtering of the red and blue color channels of the blended RGB image frame is based on image data of at least one of the green color channel and a white color channel of the blended RGB image frame.

20 Claims, 15 Drawing Sheets

(56) References Cited

U.S. PATENT DOCUMENTS

| | | | |
|---|---|---|---|
| 8,638,342 | B2 | 1/2014 | Cote et al. |
| 8,644,640 | B2 | 2/2014 | Demandolx |
| 8,718,361 | B2 | 5/2014 | Moon et al. |
| 8,724,895 | B2 | 5/2014 | Lin et al. |
| 9,094,565 | B2 | 7/2015 | Wang et al. |
| 9,140,608 | B2 | 9/2015 | Kim et al. |
| 9,185,376 | B2 | 11/2015 | Tai et al. |
| 9,672,599 | B2 | 6/2017 | Kim et al. |
| 9,979,942 | B2 * | 5/2018 | Lim ............ H04N 9/67 |
| 10,097,765 | B2 | 10/2018 | Sheikh et al. |
| 10,638,060 | B2 * | 4/2020 | Liu ............. H04N 23/11 |
| 10,853,913 | B2 | 12/2020 | Chuang et al. |
| 10,902,558 | B2 | 1/2021 | Ferres et al. |
| 11,062,436 | B2 | 7/2021 | Pekkucuksen et al. |
| 2009/0285480 | A1 * | 11/2009 | Bennett ............ G06T 5/70 382/167 |
| 2011/0050918 | A1 | 3/2011 | Tachi |
| 2014/0118582 | A1 * | 5/2014 | Artyomov ......... H04N 23/81 348/242 |
| 2015/0163465 | A1 * | 6/2015 | Li ............... H04N 25/134 348/308 |
| 2015/0363913 | A1 | 12/2015 | Higgins |
| 2016/0277721 | A1 | 9/2016 | Roffet |
| 2017/0163951 | A1 * | 6/2017 | Getman ............ G06T 5/92 |
| 2018/0025478 | A1 * | 1/2018 | Lee ............. H04N 23/90 382/284 |
| 2018/0197277 | A1 * | 7/2018 | Shi ............. G06T 5/70 |
| 2019/0378258 | A1 | 12/2019 | Fan et al. |
| 2020/0396398 | A1 | 12/2020 | Romanenko et al. |
| 2021/0019530 | A1 | 1/2021 | Tang et al. |
| 2022/0198625 | A1 * | 6/2022 | McElvain ........... G06T 5/70 |
| 2022/0335663 | A1 | 10/2022 | Hill et al. |
| 2023/0033458 | A1 * | 2/2023 | Li ............... G06V 10/776 |
| 2023/0035482 | A1 | 2/2023 | Glotzbach et al. |

FOREIGN PATENT DOCUMENTS

| | | |
|---|---|---|
| JP | 2021082211 A | 5/2021 |
| KR | 10-2014-0055503 A | 5/2014 |
| KR | 10-1703354 B1 | 2/2017 |
| KR | 10-2055411 B1 | 12/2019 |
| WO | 2021/058347 A1 | 4/2021 |

OTHER PUBLICATIONS

Wronski et al., "Handheld Multi-Frame Super-Resolution", ACM Trans. Graph, vol. 38, No. 4, Jul. 2019, 24 pages.
Barnes, "Image Filtering, Warping and Sampling", 147 pages, 2016.
Glotzbach et al., "A Method of Color Filter Array Interpolation with Alias Cancellation Properties", IEEE, 2001, 4 pages.
He et al., "Guided Image Filtering", IEEE Transactions on Pattern Analysis and Machine Intelligence, Oct. 2012, 14 pages.
Jee et al., "Sensitivity and Resolution Improvement in RGBW Color Filter Array Sensor", Senors, May 2018, 18 pages.
Wikipedia, "Bayer filter", en.wikipedia.org, May 2021, 16 pages.
Glotzbach et al., Apparatus and Method for Combined Intraband and Interband Multi-Frame Demosaicing, U.S. Appl. No. 17/649,095, filed Jan. 27, 2022, 87 pages.
International Search Report and Written Opinion of the International Searching Authority dated Oct. 7, 2022 in connection with International Patent Application No. PCT/KR2022/009080, 10 pages.
Notice of Allowance issued Jul. 3, 2024 in connection with U.S. Appl. No. 17/649,095, 11 pages.
Supplementary European Search Report dated May 23, 2024 in connection with European Patent Application No. 22842498.2, 43 pages.
Karch et al., "Robust super-resolution by fusion of interpolated frames for color and grayscale images," Frontiers in Physics, Apr. 2015, 14 pages.
Farsiu et al., "Video-to-Video Dynamic Super-Resolution for Grayscale and Color Sequences," EURASIP Journal on Applied Signal Processing, vol. 2006, Article ID 61859, 2006, 15 pages.
Wu et al., "Joint Spatial-Temporal Color Demosaicking," SCIA 2005, LNCS 3540, Jun. 2005 18 pages.

\* cited by examiner

APPARATUS AND METHOD FOR INTERBAND DENOISING AND SHARPENING OF IMAGES

CROSS-REFERENCE TO RELATED APPLICATION AND PRIORITY CLAIM

This application claims priority under 35 U.S.C. § 119(e) to U.S. Provisional Patent Application No. 63/222,187 filed on Jul. 15, 2021 and to U.S. Provisional Patent Application No. 63/294,462 filed on Dec. 29, 2021. These provisional applications are hereby incorporated by reference in their entirety.

TECHNICAL FIELD

This disclosure relates generally to image processing systems. More specifically, this disclosure relates to an apparatus and method for interband denoising and sharpening of images.

BACKGROUND

Many mobile electronic devices, such as smartphones and tablet computers, include cameras that can be used to capture still and video images. While convenient, cameras on mobile electronic devices typically suffer from a number of shortcomings. For example, many mobile electronic devices often suffer from aliasing artifacts created during the generation of images of scenes. Aliasing artifacts can have various causes depending on the circumstances. Common sources of aliasing artifacts include (i) capturing images while using a digital zoom feature and (ii) performing demosaicing operations to reconstruct image data captured using color filter arrays.

SUMMARY

This disclosure provides an apparatus and method for interband denoising and sharpening of images.

In a first embodiment, a method includes obtaining a blended red-green-blue (RGB) image frame of a scene. The method also includes performing, using at least one processing device of an electronic device, an interband denoising operation to remove at least one of noise and one or more artifacts from the blended RGB image frame in order to produce a denoised RGB image frame. Performing the interband denoising operation includes performing filtering of red, green, and blue color channels of the blended RGB image frame to remove at least one of the noise and the one or more artifacts from the blended RGB image frame. The filtering of the red and blue color channels of the blended RGB image frame is based on image data of at least one of the green color channel and a white color channel of the blended RGB image frame. In another embodiment, a non-transitory computer readable medium may contain instructions that when executed cause at least one processing device of an electronic device to perform the method of the first embodiment.

In a second embodiment, an electronic device includes at least one processing device configured to obtain a blended RGB image frame of a scene. The at least one processing device is also configured to perform an interband denoising operation to remove at least one of noise and one or more artifacts from the blended RGB image frame in order to produce a denoised RGB image frame. To perform the interband denoising operation, the at least one processing device is configured to perform filtering of red, green, and blue color channels of the blended RGB image frame to remove at least one of the noise and the one or more artifacts from the blended RGB image frame. The at least one processing device is configured to perform the filtering of the red and blue color channels of the blended RGB image frame based on image data of at least one of the green color channel and a white color channel of the blended RGB image frame.

In a third embodiment, a method includes obtaining a blended RGB image frame of a scene. The method also includes performing, using at least one processing device of an electronic device, an interband sharpening operation to sharpen different color channels of the blended RGB image frame in order to produce a sharpened RGB image frame. Performing the interband sharpening operation includes using high-pass information associated with at least one of a green color channel and a white color channel of a reference image frame used to produce the blended RGB image frame. In another embodiment, an electronic device may include at least one imaging sensor and at least one processing device configured to perform the method of the third embodiment. In still another embodiment, a non-transitory computer readable medium may contain instructions that when executed cause at least one processor of an electronic device to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
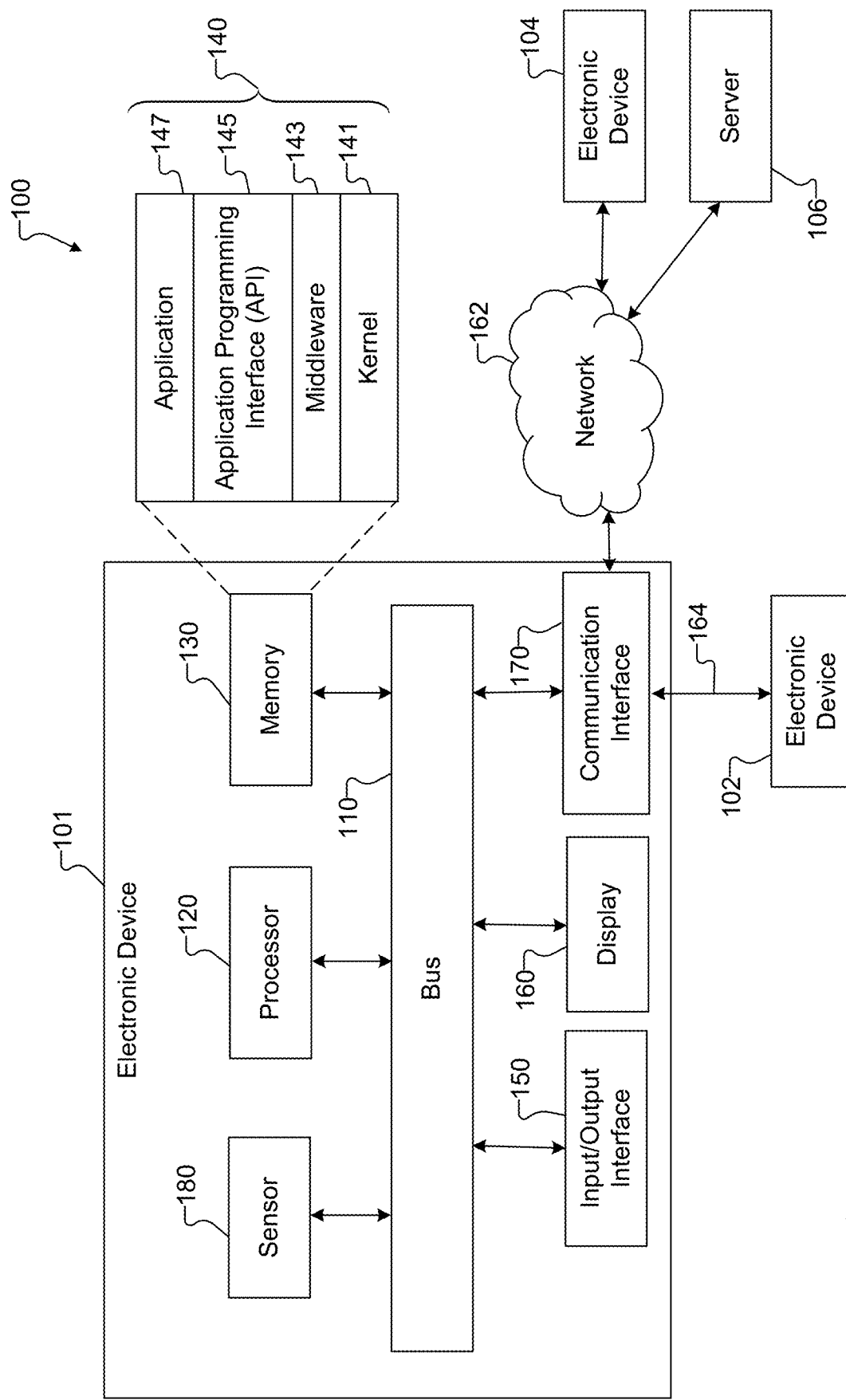
FIG. 1 illustrates an example network configuration including an electronic device in accordance with this disclosure.

FIGS. 1 through 21, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. While convenient, cameras on mobile electronic devices typically suffer from a number of shortcomings. For example, many mobile electronic devices often suffer from aliasing artifacts created during the generation of images of scenes. Aliasing artifacts can have various causes depending on the circumstances. Common sources of aliasing artifacts include (i) capturing images while using a digital zoom feature and (ii) performing demosaicing operations to reconstruct image data captured using color filter arrays.

Demosaicing refers to a process where a full-color image frame can be reconstructed based on image data captured by an imaging sensor that uses a color filter array. A color filter array represents an array of color filters, where each color filter typically passes light of a specific color spectrum (such as red, green, blue, or white) to an associated pixel and where different pixels capture image data for different color spectra. The data associated with each color spectrum may be referred to as a "channel" for an image frame. When a color filter array is used, only one color spectrum is typically sampled at each pixel for an image frame. Demosaicing may be used to convert image data produced using a Bayer filter array or other color filter array into reconstructed red-green-blue (RGB) data. For example, a demosaicing process can perform various interpolations to fill in missing information, such as by estimating other colors' image data for each pixel. Moreover, when using a Bayer filter array or some other types of color filter arrays, approximately twice as many pixels may capture image data using green filters compared to pixels that capture image data using red or blue filters. This introduces non-uniformities into the captured image data, such as when the red and blue image data each have a lower signal-to-noise ratio (SNR) and a lower sampling rate compared to the green image data. Among other things, the green image data can capture high-frequency image content more effectively than the red and blue image data. The demosaicing process can take information captured by at least one highly-sampled channel (such as the green channel and/or the white channel) and use that information to correct limitations of lower-sampled channels (such as the red and blue channels), which can help to reintroduce high-frequency image content into the red and blue image data. However, standard demosaicing techniques are single-frame techniques, which means they operate to adjust image data within each individual image frame. Single-frame demosaicing techniques introduce aliasing artifacts into generated images of scenes, such as by producing aliasing artifacts along edges of objects in scenes, which can degrade image quality.

A digital zoom feature refers to a feature where the appearance of zooming (narrowing a camera's field of view onto a smaller portion of a scene) is achieved digitally rather than optically. Optical zoom is typically achieved by moving lenses or otherwise manipulating one or more optical devices. Digital zoom is typically achieved programmatically by scaling a captured image frame, such as by performing interpolations using captured image data in order to artificially increase the image data's sampling rate. However, digital zooming often introduces aliasing artifacts, such as by degrading the appearance of edges in generated images of scenes, which can also degrade image quality.

As described in more detail below, multi-frame blending of multiple input image frames is used in order to reduce artifacts caused by one or more aliasing phenomena. For example, one or more imaging sensors may be used to capture multiple input image frames associated with a scene, where small shifts may occur in the position(s) of the one or more imaging sensors during the capture of the input image frames. As a result, the input image frames may capture the same scene, but there are typically small variations between the input image frames.

In one aspect, this disclosure provides techniques for combined intraband and interband multi-frame demosaicing. An "intraband" demosaicing operation can be applied to the input image frames in order to produce RGB input image frames. The intraband demosaicing operation here can be performed in order to convert image data (such as from Bayer or other data to RGB data) and/or to perform image scaling or resizing (such as during digital zooming). The RGB input image frames can be blended in order to produce blended RGB image frames, which in some cases may represent high dynamic range (HDR) image frames. In some embodiments, the intraband demosaicing operation supports the use of a diverse set of filter kernels to perform a scaling/interpolation process, where the specific kernel(s) used with specific image data can be selected by locally measuring image content and selecting the most appropriate kernel(s) according to factors such as gradient strength, coherence, and orientation of the image content. While each RGB input image frame may contain aliasing (such as from scaling and demosaicing), the blending here can reduce or eliminate this aliasing within each channel (red, green, and blue) of the blended RGB image frames. Since aliasing in a demosaicing process and aliasing in a scaling process may each be modeled as a zero-mean random process, blending multiple image frames from this random process tends to average back to a mean of zero, which means that aliasing caused by the intraband demosaicing operation can be significantly reduced or eliminated.

There may still be missing high-frequency content in the red and blue image data compared to the green image data even after the intraband demosaicing operation and other image processing operations have occurred. Thus, an "interband" demosaicing operation can subsequently be performed to reduce or eliminate remaining aliasing. For example, the interband demosaicing operation can substantially equalize high-frequency content in various channels, such as by substantially equalizing the high-frequency content in the red, green, and blue image data, in order to improve edge quality and perception of image blur. The interband demosaicing operation may also identify areas of image frames associated with motion within a scene. These areas of the image frames are often not blended so as to avoid the creation of motion blur, and the interband demosaicing operation contributes to at least partially removing any aliasing that is present when the blending output is the same as a single-frame output.

In another aspect, this disclosure provides techniques for interband denoising and interband sharpening for use with image data captured using a color filter array (such as a Bayer color filter array or a red-green-blue-white or "RGBW" color filter array). Interband denoising and interband sharpening operations can be performed to improve the quality of subsampled or "secondary" channels (such as the red and blue channels) using the higher-quality or "primary" channel(s) (such as the green channel and/or the white channel) having a higher sampling rate. This helps to substantially equalize the signal quality across all of an image frame's color channels. For instance, the interband denoising operation can reduce artifacts (such as sampling, interpolation, and aliasing artifacts) and noise in secondary channels by using the image data from the primary channel (s). The interband sharpening operation can use an adaptive kernel design to adapt to the specific nature of the high-frequency content in the primary channel(s) to naturally add image details to the secondary channels without creating halo artifacts. This allows the interband sharpening operation to add halo artifact-free details into the secondary channels.

Among other things, these approaches may be used to reduce noise, reduce scaling artifacts and other artifacts, provide high dynamic range, and preserve fine image details in final images of scenes. Note that it is often assumed below that both (i) combined intraband and interband multi-frame demosaicing and (ii) interband denoising and interband sharpening may be used together in the same electronic device when generating images of scenes. This is for illustration and explanation only, and an electronic device may implement only one of these two overall functionalities in other cases. In still other cases, an electronic device may implement only one of these two overall functionalities when generating some images of scenes and may implement both of these two overall functionalities when generating other images of scenes.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 can receive image data captured by at least one imaging sensor and process the image data to perform combined intraband and interband multi-frame demosaicing. In other cases, the processor 120 can receive image data captured by at least one imaging sensor and process the image data to perform interband denoising and interband sharpening. In still other cases, the processor 120 can receive image data captured by at least one imaging sensor and process the image data to perform combined intraband and interband multi-frame demosaicing and to perform interband denoising and interband sharpening.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image processing (such as to perform combined intraband and interband multi-frame demosaicing and/or to perform interband denoising and interband sharpening) as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can receive image data captured by at least one imaging sensor and process the image data to perform combined intraband and interband multi-frame demosaicing. In other cases, the server 106 can receive image data captured by at least one imaging sensor and process the image data to perform interband denoising and interband sharpening. In still other cases, the server 106 can receive image data captured by at least one imaging sensor and process the image data to perform combined intraband and interband multi-frame demosaicing and to perform interband denoising and interband sharpening.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
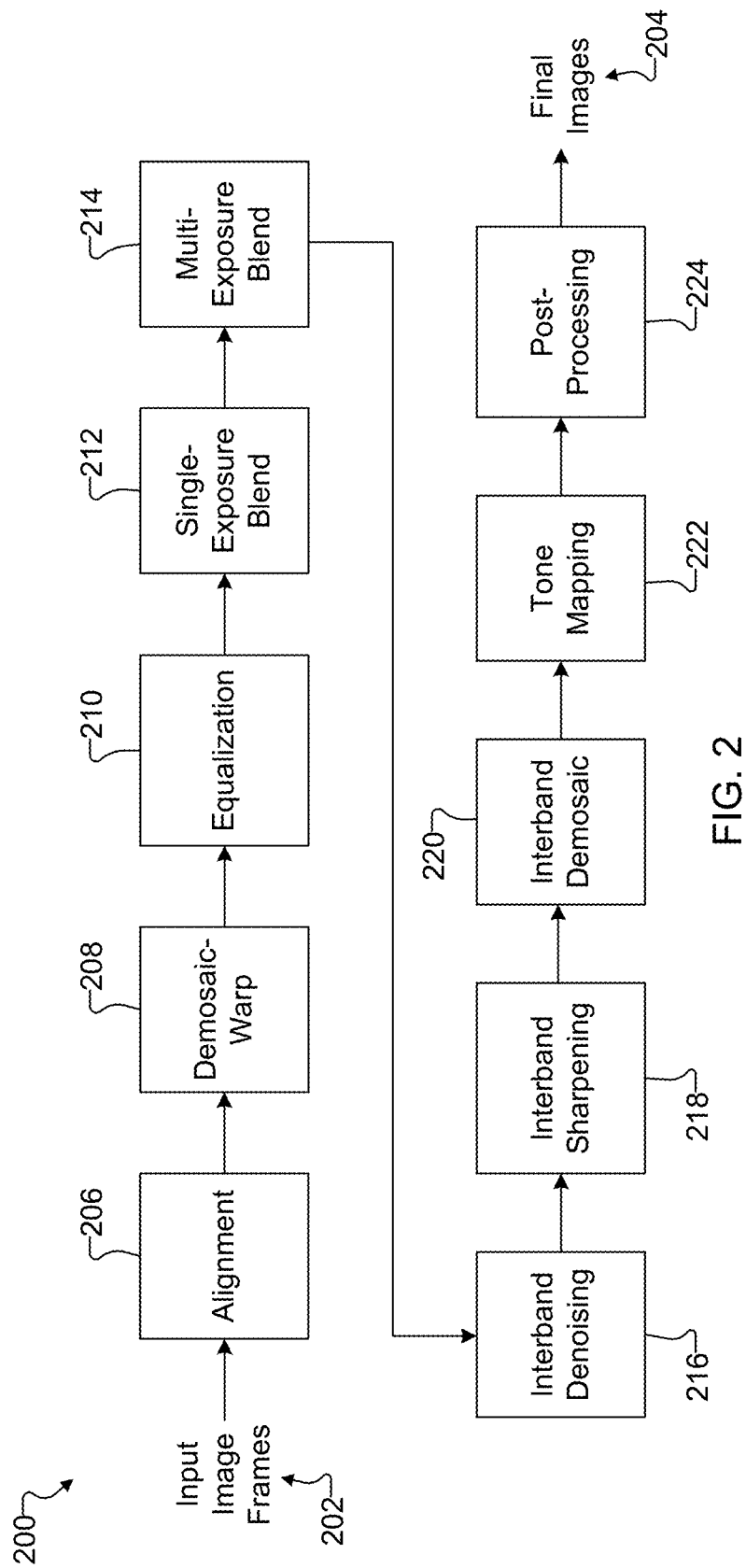
FIG. 2 illustrates an example image processing architecture that supports multi-frame blending with intraband and interband multi-frame demosaicing and with interband denoising and interband sharpening according to this disclosure.

FIG. 2 illustrates an example image processing architecture 200 that supports multi-frame blending with intraband and interband multi-frame demosaicing and with interband denoising and interband sharpening according to this disclosure. For ease of explanation, the image processing architecture 200 shown in FIG. 2 is described as involving the use of the electronic device 101 in the network configuration 100 of FIG. 1. However, the image processing architecture 200 shown in FIG. 2 could be used with any other suitable device and in any other suitable system, such as when the image processing architecture 200 is executed or supported by the server 106.

As shown in FIG. 2, the image processing architecture 200 operates to receive input image frames 202 and generate final images 204. The input image frames 202 generally represent captured images of scenes, such as Bayer, RGBW, or other image frames captured using a color filter array. In some embodiments, a group of related input image frames 202 may be received and processed, such as when a user triggers an image capture operation of the electronic device 101 and one or more imaging sensors 180 capture multiple images of the same scene at or near the same time. Also, in some embodiments, the input image frames 202 may include image frames captured using different exposures, such as when the input image frames 202 include one or more shorter-exposure image frames (which may include little or no motion blur) and one or more longer-exposure image frames (which may include more motion blur). As a particular example, the input image frames 202 may include one or more image frames captured at an "EV-0" or auto-exposure level, one or more image frames captured at an "EV-1" or other shorter exposure level (compared to the "EV-0" level), and one or more image frames captured at an "EV+1" or other longer exposure level (compared to the "EV-0" level). In some cases, each input image frame 202 may be divided into multiple channels of data, such as when each input image frame 202 includes red, green, and blue (and optionally white) channels of image data. In particular embodiments, each channel of each input image frame 202 may include twelve-bit image data values associated with a specific color spectrum. The final images 204 generally represent images of scenes that are generated by the image processing architecture 200 based on the input image frames 202. Each input image frame 202 and each final image 204 may have any suitable resolution, which may vary based on (among other things) the imaging sensor(s) 180 being used.

In this example, a set of multiple input image frames 202 is provided to an alignment function 206, which generally operates to determine how one or more of the input image frames 202 would need to be warped in order to align one or more features of the input image frames 202. For example, the alignment function 206 may select a reference image frame from among the set of input image frames 202, such as by selecting the input image frame 202 with a specified exposure level (like an "EV-0" or other exposure level). The one or more other input image frames 202 that are not selected as the reference image frame may be referred to as one or more "non-reference" image frames. The alignment function 206 can also determine how the one or more non-reference image frames would need to be warped or otherwise modified in order to more closely align one or more features in the non-reference image frame(s) with one or more corresponding features in the reference image frame. In some embodiments, the alignment function 206 generates a warp or alignment map for each non-reference image frame, where each warp or alignment map includes or is based on one or more motion vectors that identify how the position(s) of the one or more specific features in the associated non-reference image frame should be altered in order to be in the position(s) of the same feature(s) in the reference image frame. Alignment may be needed in order to compensate for misalignment caused by the electronic device 101 moving or rotating in between image captures, which causes objects in the input image frames 202 to move or rotate slightly (as is common with handheld devices). The alignment function 206 may use any suitable technique for image alignment, which is also sometimes referred to as image registration. In some cases, the input image frames 202 can be aligned both geometrically and photometrically. In particular embodiments, the alignment function 206 can use global Oriented FAST and Rotated BRIEF (ORB) features and local features from a block search to identify how to align the image frames, although other implementations of the alignment function 206 could also be used.

The input image frames 202 and the warp or alignment maps or other outputs generated by the alignment function 206 are provided to an intraband demosaic-warp function 208, which generally operates to warp one or more of the input image frames 202 so that the contents of the input image frames 202 are more closely aligned. The demosaic-warp function 208 also performs an intraband demosaic operation that processes the input image frames 202 (or the aligned versions thereof) to produce RGB input image frames in which missing data in the input image frames' various color channels is reconstructed. The intraband demosaicing operation here can convert image data (such as from Bayer or RGBW data to RGB data) and/or perform image scaling or resizing. Each RGB input image frame that is generated by the demosaic-warp function 208 corresponds to one of the input image frames 202, so the demosaic-warp function 208 can generate a set of RGB input image frames based on the set of input image frames 202. Each RGB input image frame includes complete image data in multiple color channels (the red, green, and blue color channels) and may include one or more channels that have been subjected to low-pass filtering as described below. In particular embodiments, each RGB input image frame may include between four and six channels (depending on the input image frames 202), and each channel of each RGB input image frame may include twelve-bit image data values. Example embodiments and operations of the demosaic-warp function 208 are provided below.

The RGB input image frames generated by the demosaic-warp function 208 may be provided to an equalization function 210, which generally operates to substantially equalize the brightness levels of the RGB input image frames in order to produce equalized RGB input image frames. For example, as noted above, different ones of the input image frames 202 may be captured using different exposures, such as when different input image frames 202 are captured using the EV−1, EV+0, and EV+1 exposures (although other or additional exposure levels may be used). The equalization function 210 can adjust the brightness of one or more of the RGB input image frames generated by the demosaic-warp function 208 so that the equalized RGB input image frames have substantially equal brightness. In some embodiments, for instance, the equalization function 210 may increase the brightness of one or more RGB input image frames having a shorter exposure in order to more closely match the brightness of one or more RGB input image frames having a longer exposure and/or decrease the brightness of one or more RGB input image frames having a longer exposure in order to more closely match the brightness of one or more RGB input image frames having a shorter exposure. The equalization function 210 may use any suitable technique to equalize image frames captured at different exposures. In particular embodiments, each channel of each equalized RGB input image frame generated by the equalization function 210 may include sixteen-bit image data values.

The equalized RGB input image frames generated by the equalization function 210 are blended, which in this example occurs using a single-exposure blending function 212 and a multi-exposure blending function 214. For example, the single-exposure blending function 212 may be used to blend equalized RGB input image frames that were captured at the same exposure level to produce blended image frames. As a particular example, the single-exposure blending function 212 may blend equalized RGB input image frames captured at the EV−1 exposure, blend equalized RGB input image frames captured at the EV−0 exposure, and/or blend equalized RGB input image frames captured at the EV+1 exposure. Note that, if a single image frame was captured at a specified exposure level, no single-exposure blending may be needed. Also note that the number of blended image frames produced here can depend on various factors, such as the number of exposure levels used to capture the input image frames 202 and whether multiple image frames were captured at each exposure level. The multi-exposure blending function 214 can blend the blended image frames produced by the single-exposure blending function 212 (possibly along with any unblended image frames that were not blended by the single-exposure blending function 212) in order to generate blended RGB image frames. In some cases, the blended RGB image frames may represent HDR image frames, which represent blended versions of the image frames input to the multi-exposure blending function 214 but which have a larger dynamic range than any individual image frame input to the multi-exposure blending function 214.

The single-exposure blending function 212 and the multi-exposure blending function 214 may each use any suitable technique to blend or otherwise combine multiple image frames. As noted above, even though each RGB input image frame produced by the demosaic-warp function 208 may include aliasing artifacts, the process of blending multiple image frames (possibly across multiple exposure levels) can help to reduce or eliminate the aliasing artifacts in the blended image frames. This can be particularly useful when the aliasing may be modeled as a zero-mean random process, so blending over multiple image frames tends to average the aliasing artifacts back to a mean of zero. Note that while two separate blending functions 212 and 214 are shown here, any other suitable blending function or functions may be used to blend the equalized RGB input image frames generated by the equalization function 210.

The blended RGB image frames generated by the blending functions 212 and 214 are provided to an interband denoising function 216, which generally operates to reduce noise in the blended RGB image frames in order to produce denoised RGB image frames. For example, the interband denoising function 216 may be used to remove sampling, interpolation, and aliasing artifacts and noise in subsampled image color channels (namely the red and blue channels) using information from at least one higher-sampled color channel (namely the green channel and/or the white channel). This improves the quality of the subsampled color channels based on the color channel(s) having a higher sampling rate, which helps to equalize the signal quality across all of the color channels. Example embodiments and operations of the interband denoising function 216 are provided below.

The denoised RGB image frames generated by the interband denoising function 216 are provided to an interband sharpening function 218, which generally operates to add details into the subsampled color channels (namely the red and blue channels) using at least one higher-sampled color channel (namely the green channel and/or the white channel) in order to generate sharpened RGB image frames. For example, in some cases, this is accomplished using kernel-adaptive high-pass signals from the higher-sampled color channel(s). This allows the interband sharpening function 218 to adapt to the specific nature of the high-frequency content in the primary color channel(s) in order to naturally add details to the secondary color channels without producing halo artifacts. Example embodiments and operations of the interband sharpening function 218 are provided below.

The sharpened RGB image frames generated by the interband sharpening function 218 are provided to an interband demosaic function 220, which generally operates to substantially equalize high-frequency content in the various color channels of the sharpened RGB image frames in order to generate equalized sharpened RGB image frames. For example, the interband demosaic function 220 can equalize the high-frequency content in the red, green, and blue channels of each sharpened RGB image frame in order to generate a corresponding equalized sharpened RGB image frame. In some cases, the interband demosaic function 220 may identify one or more areas of image frames associated with motion within a scene being imaged. During prior blending operations, blending may be avoided in one or more areas of a scene in which there is at least some threshold amount of motion, such as an object moving within the scene. Attempting to blend these areas of image frames may result in motion blur, so the prior blending operations may extract at least a portion of an image frame (such as from the image frame having the least amount of motion) and use that portion of the image frame without blending. In those cases, the interband demosaic function 220 can help to remove aliasing that is present as a result. In particular embodiments, each equalized sharpened RGB image frame generated by the interband demosaic function 220 may include three channels (red, green, and blue), and each of these channels may include sixteen-bit image data values. Example embodiments and operations of the interband demosaic function 220 are provided below.

The equalized sharpened RGB image frames generated by the interband demosaic function 220 may undergo one or more post-processing operations, such as by being processed by a tone-mapping function 222 and/or one or more other post-processing functions 224, in order to generate the final images 204. For example, the tone-mapping function 222 may convert the high dynamic range of the equalized sharpened RGB image frames into a more displayable range, such as one with an eight-bit depth. This may be done to increase the contrast of the equalized sharpened RGB image frames and produce higher-contrast RGB image frames, which may be further processed by the one or more other post-processing functions 224. The one or more other post-processing functions 224 may involve any other suitable image processing operations, such as an additional noise reduction operation and/or an edge sharpening operation.

The image processing architecture 200 shown in FIG. 2 may provide various advantages or benefits depending on the implementation. For example, the use of multi-frame blending with combined intraband and interband demosaicing may allow for images of scenes to be generated with fewer or no aliasing artifacts caused by the demosaicing. The intraband demosaicing can be performed prior to blending, which allows aliasing artifacts generated during the intraband demosaicing to be substantially reduced or eliminated during the subsequent blending. The interband demosaicing can be performed after blending to help resolve certain non-uniformities remaining in the image data. Overall, this allows demosaicing to occur while reducing or eliminating aliasing artifacts caused by the demosaicing. Moreover, the use of multi-frame blending with interband denoising and interband sharpening can substantially equalize the signal quality across the different color channels of blended image frames and add image details without creating halos. This can significantly increase the overall image quality of the final images 204.

It should be noted that the functions shown in or described with respect to FIG. 2 can be implemented in an electronic device 101, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an image processing architecture 200 that supports multi-frame blending with intraband and interband multi-frame demosaicing and with interband denoising and interband sharpening, various changes may be made to FIG. 2. For example, various functions shown in FIG. 2 may be combined, further subdivided, replicated, omitted, or rearranged and additional functions may be added according to particular needs. Also, as noted above, it is assumed here that both (i) combined intraband and interband multi-frame demosaicing and (ii) interband denoising and interband sharpening may be used together in the same image processing architecture 200. However, the image processing architecture 200 may support one of these functionalities and not the other.

Figure 3:
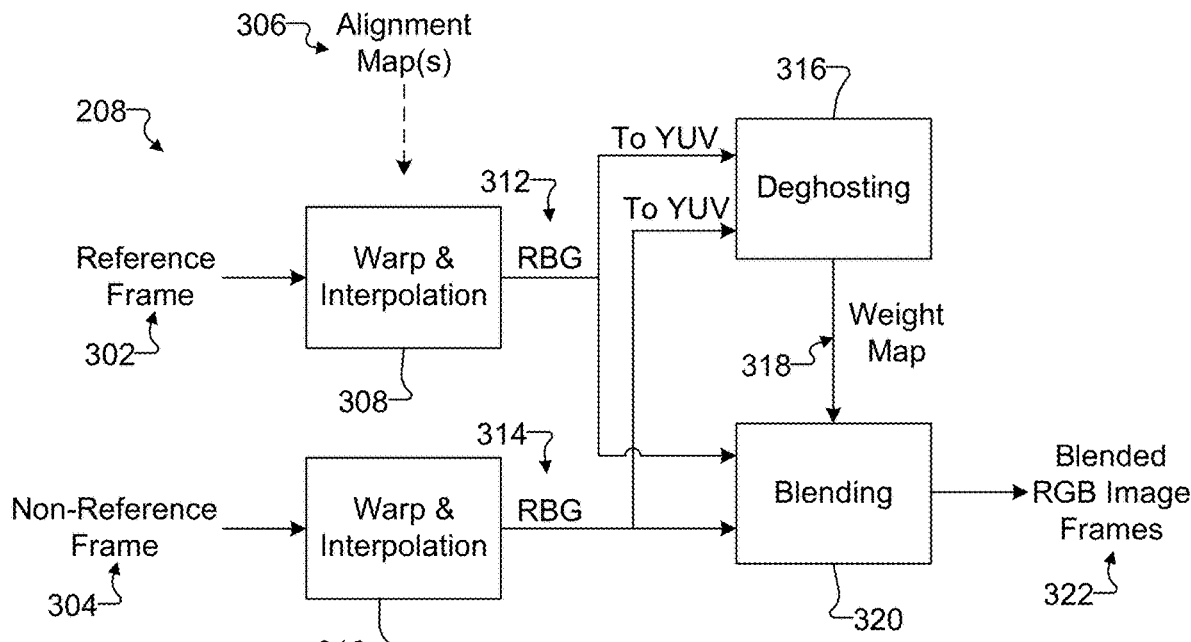
FIG. 3 illustrates an example demosaic-warp function and example interactions between the demosaic-warp function, a single-exposure blending function, and a multi-exposure blending function in the image processing architecture of FIG. 2 according to this disclosure.

FIG. 3 illustrates an example demosaic-warp function 208 and example interactions between the demosaic-warp function 208, the single-exposure blending function 212, and the multi-exposure blending function 214 in the image processing architecture 200 of FIG. 2 according to this disclosure. As shown in FIG. 3, the demosaic-warp function 208 can receive a reference image frame 302 and at least one non-reference image frame 304 as inputs. The reference image frame 302 can represent the input image frame 202 selected by the alignment function 206 to be the reference frame, and the at least one non-reference image frame 304 can represent at least one input image frame 202 not selected by the alignment function 206 to be the reference frame. The demosaic-warp function 208 also receives one or more alignment maps 306 from the alignment function 206 as inputs. Each alignment map 306 can identify how at least one of the image frames 302, 304 may be warped in order to more closely align one or more features contained in the image frames 302, 304.

In this example, the demosaic-warp function 208 is implemented using warp and interpolation functions 308 and 310. The reference image frame 302 is processed using the warp and interpolation function 308, and each non-reference image frame 304 is processed using the warp and interpolation function 310. Each of the warp and interpolation functions 308 and 310 is configured to perform intraband joint demosaicing and warping operations respectively using the image frames 302 and 304. In some cases, the warp and interpolation functions 308, 310 may operate in parallel in order to process different image frames 302, 304 at the same time. In other cases, the warp and interpolation functions 308, 310 may operate serially in order to process different image frames 302, 304 sequentially, in which case there may be only one instance of the warp and interpolation function 308 or 310.

Each warp and interpolation function 308, 310 generally operates to warp one or more of the image frames 302, 304 so that one or more features contained in the image frames 302, 304 are more closely aligned. As a particular example, the warp and interpolation functions 308, 310 may warp one or more of the image frames 302, 304 so that one or more objects captured in the image frames 302, 304 are located at substantially the same position(s) in the warped versions of the image frames 302, 304. Depending on the implementation, only the non-reference image frame(s) 304 may be warped for this purpose, or both the reference image frame 302 and the non-reference image frame(s) 304 may be warped for this purpose.

Each warp and interpolation function 308, 310 also generally operates to interpolate image data in order to reconstruct full single-color spectrum image frames. This allows each warp and interpolation function 308, 310 to implement intraband joint demosaicing and warping. As noted above, the image frames 302, 304 may be generated using a color filter array. As a result, each image frame 302, 304 may be associated with multiple single-color spectrum channels, and each pixel of each image frame 302, 304 may be associated with a single color spectrum. Each warp and interpolation function 308, 310 can therefore perform interpolation operations in order to estimate image data for all of the color spectra at each pixel of the image frames 302, 304. For instance, each warp and interpolation function 308, 310 can perform interpolation using red image data to estimate red values across all pixels of the image frames 302, 304, perform interpolation using green image data to estimate green values across all pixels of the image frames 302, 304, and perform interpolation using blue image data to estimate blue values across all pixels of the image frames 302, 304. The warp and interpolation functions 308, 310 thereby generate RGB input image frames 312 and 314, which respectively represent multi-channel full-size RGB versions of the reference and non-reference image frames 302, 304.

In this example, the RGB input image frames 312 and 314 are converted into the YUV domain and provided to a deghosting function 316. The YUV domain represents image data using luminance or luma values (Y) and chrominance values (U and V). The conversion to the YUV domain may be performed by the deghosting function 316 itself or by a function that receives and converts the RGB input image frames 312 and 314 into YUV image data. The deghosting function 316 generally operates to identify motion in a scene that is captured by the image frames 302 and 304. For example, the deghosting function 316 may compare the YUV version of each RGB input image frame 314 (which is associated with a non-reference image frame 304) to the YUV version of the RGB input image frame 312 (which is associated with the reference image frame 302) in order to identify any area(s) of the non-reference image frame 304 differing by at least a threshold amount or percentage compared to the same area(s) of the reference image frame 302. When motion is present in at least a portion of the scene being captured, blending of multiple image frames in at least that portion of the scene may be avoided in order to reduce or prevent the creation of motion blur (which is also called ghosting). In some cases, the deghosting function 316 can generate at least one weight map 318 that identifies how two or more image frames are to be blended, such as when a weight map 318 includes values that indicate a weight to be applied to one or more of the RGB input image frames 312 and 314 during blending. If motion is detected in a specific area of a scene, the weight map 318 may indicate that, during blending, most or all of the image content for that specific area of the scene should come from a single RGB input image frame 312 or 314 (such as the RGB input image frame 312 or 314 captured using the shortest exposure). The deghosting function 316 may use any suitable technique to identify how to blend multiple image frames to reduce or avoid the creation of motion blur.

The RGB input image frames 312 and 314 and the at least one weight map 318 are provided to a blending function 320, which blends the RGB input image frames 312 and 314 based on the weights contained in the weight map(s) 318. The blending function 320 may use any suitable technique to blend image frames. In some embodiments, the blending function 320 may represent the single-exposure blending function 212 and the multi-exposure blending function 214 described above (in which case the equalization function 210 may be performed prior to the blending function 320). The blending here results in the creation of blended RGB image frames 322, which may represent the image frames that are provided to the interband denoising function 216. In some cases, each blended RGB image frame 322 may represent an HDR image frame, which may be produced when image frames captured at different exposure levels are blended to thereby increase the dynamic range of the blended RGB image frame 322.

Note that intraband demosaicing is occurring here with multiple image frames 302, 304 and that the resulting RGB input image frames 312, 314 are then blended. The blending of multiple image frames helps to reduce noise, and the blending of multiple image frames after intraband demosaicing has occurred helps to reduce or eliminate any aliasing artifacts that are generated by the demosaicing process. This can result in significantly better image quality compared to other approaches.

Figure 4:
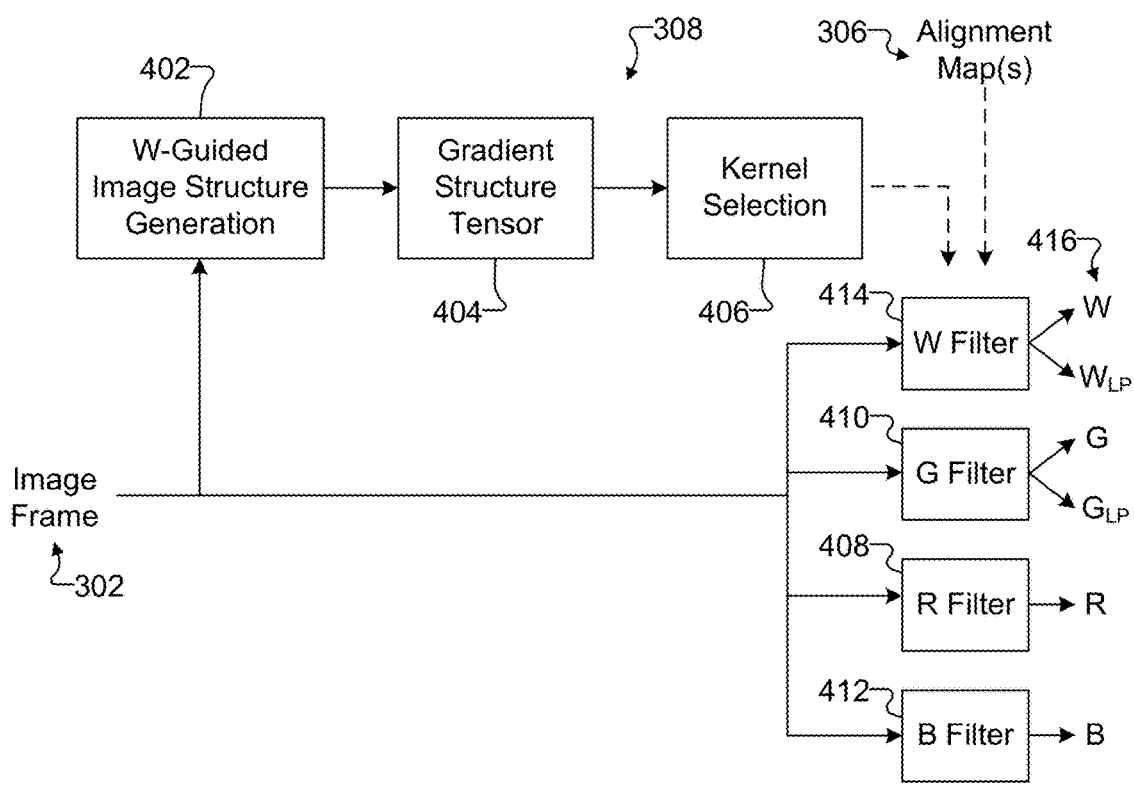
FIG. 4 illustrates an example warp and interpolation function in the demosaic-warp function of FIG. 3 according to this disclosure.

FIG. 4 illustrates an example warp and interpolation function 308 in the demosaic-warp function 208 of FIG. 3 according to this disclosure. In some embodiments, the warp and interpolation function 308 may be implemented using a kernel-adaptive approach in which filtering operations are performed using filters (also called kernels) that are selected based on the image content of the image frames 302 being processed. As shown in FIG. 4, the warp and interpolation function 308 receives a reference image frame 302 as input. The image frame 302 is provided to a white (W)-guided image structure generation function 402, which generally operates to produce a single-channel image frame that contains structural information about the scene being captured in the image frame 302. For example, the structural information may represent information such as the locations and edges of one or more objects (and possibly numerous objects) captured in the scene. Example embodiments and operations of the W-guided image structure generation function 402 are provided below.

A gradient structure tensor function 404 processes the single-channel image frame generated by the W-guided image structure generation function 402 in order to identify one or more characteristics of the structural information contained in the single-channel image frame. For example, in some embodiments, the gradient structure tensor function 404 may identify gradients in the single-channel image frame (such as in the x and y directions) and identify gradient strength, coherence, and orientation estimates at various locations in the single-channel image frame. In some cases, the gradient structure tensor function 404 may identify gradient strength, coherence, and orientation estimates for each pixel of the single-channel image frame. A gradient strength estimate generally identifies whether image content around a specific location in an image frame is associated with a gradient and may therefore be associated with an object edge in a scene. The gradient strength estimate can be higher around edges of objects and lower in flat areas of the image frame. A coherence estimate generally identifies whether stronger gradients around a specific location in an image frame have similar orientation, and coherence estimates can be used to separate areas of an image frame with stronger gradients that are not oriented in any particular direction from areas of an image frame with stronger gradients that are oriented in a particular direction. The coherence estimate may be lower to indicate textured areas of an image frame and higher to indicate at least one oriented edge in an image frame. The orientation estimate generally identifies a measure of an angle of orientation for one or more gradients, so the orientation estimate may be used to identify if (and in what direction) one or more gradients are oriented. Example operations of the gradient structure tensor function 404 are provided below.

The outputs generated by the gradient structure tensor function 404 are provided to a kernel selection function 406, which generally operates to select specific kernels for filters 408-414 to be used to filter the image frame 302. The filters 408-414 here may be used to warp and/or interpolate the image data contained in the image frame 302. For example, the kernel selection function 406 may use the orientation, strength, and coherence estimates of image content in the image frame 302 to select appropriate kernels for a red filter 408, a green filter 410, a blue filter 412, and optionally a white filter 414 for use in filtering the image data of the image frame 302. Note that two or more of the filters 408-414 may use a common kernel and/or two or more of the filters 408-414 may use different kernels. Also note that different kernels can be used by the filters 408-414 to filter different portions of the image frame 302, such as based on different image content contained in the different portions of the image frame 302. In some embodiments, the kernel selection function 406 may have access to at least one kernel bank that includes a number of predefined filter kernels that can be used to filter image data, and the kernels selected for use by the filters 408-414 may be selected from the bank based on the orientation, strength, and coherence estimates of the image content in the image frame 302. Each filter 408-414 represents any suitable type of filter configured to filter image data. In some cases, each filter 408-414 may represent a bilateral interpolation filter, which may include both spatial and range (pixel-difference) weighting.

The filters 408-414 here generally operate to produce various outputs 416, such as red, green, blue, and optionally white channels of image data (which can collectively form an RGB input image frame 312). In some embodiments, the filters 410 and 414 may each incorporate or include a low-pass filter kernel, which may generate a low-pass green ($G_{LP}$) channel and/or a low-pass white ($W_{LP}$) channel in the outputs 416. One or both of these low-pass channels may be provided to and used by the interband sharpening function 218 as described below. Also, since the filtering of the white channel is optional, the warp and interpolation function 308 may only filter the red, green, and blue channels to produce the outputs 416 in other embodiments. Further, in some cases, each warp and interpolation function 310 may include only the filters 408-414 and be used to filter image data of a non-reference image frame 304 to produce an RGB input image frame 314. In those cases, the kernels used in the filters 408-414 for the non-reference image frame(s) 304 may be selected by the kernel selection function 406 used to select the filters 408-414 for the reference image frame 302. In addition, the filters 410 and 414 for the non-reference image frame(s) 304 may not produce the green and white low-pass channels.

Figure 5:
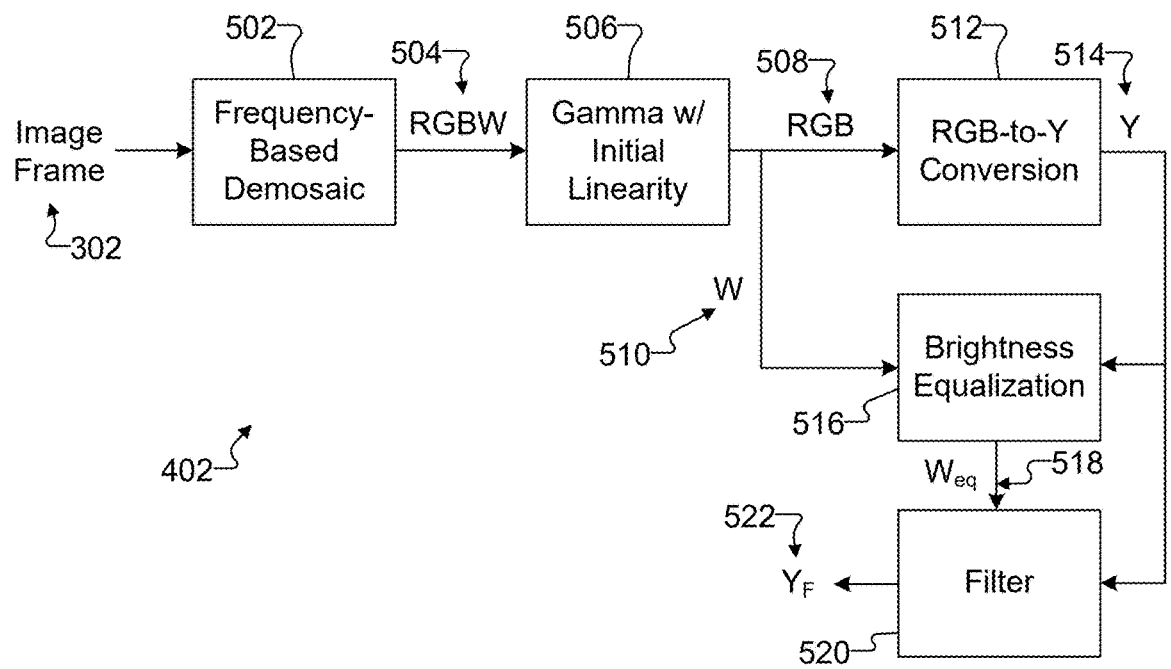
FIG. 5 illustrates an example white-guided image structure generation function in the warp and interpolation function of FIG. 4 according to this disclosure.

FIG. 5 illustrates an example W-guided image structure generation function 402 in the warp and interpolation function 308 of FIG. 4 according to this disclosure. As noted above, the W-guided image structure generation function 402 generates a single-channel image frame containing structural information about a scene as captured in an image frame 302. In this example, the image frame 302 is provided to a frequency-based demosaic function 502, which generally operates to perform interpolations in order to reconstruct image data that is missing due to the use of a color filter array. In some embodiments, for instance, the frequency-based demosaic function 502 may perform a simple interpolation by convolving neighboring pixel values with a separable low-pass filter. In some cases, this convolution may be expressed as follows:

$$W_{interp} = W \times (H \times \tfrac{1}{2}) \quad (1)$$

$$G_{interp} = G \times (H \times 1) \quad (2)$$

$$R_{interp} = R \times (H \times 2) \quad (3)$$

$$B_{interp} = B \times (H \times 2) \quad (4)$$

Here, R, G, B, and W represent original image data values from an image frame 302. Also, $R_{interp}$, $G_{interp}$, $B_{interp}$, and $W_{interp}$ represent interpolated data values generated by the frequency-based demosaic function 502. In addition, H represents the separable low-pass filter used by the frequency-based demosaic function 502. As a particular example, the separable low-pass filter used by the frequency-based demosaic function 502 may be defined using a one-dimensional (1D) array of values having the following form: [−0.0121, 0.0750, 0.2621, 0.3500, 0.2621, 0.0750, −0.0121]. The frequency-based demosaic function 502 generates a multi-channel image frame 504, such as an RGBW image frame.

A gamma curve with initial linearity function 506 applies gamma correction to the multi-channel image frame 504 in order to brighten image contents while avoiding the amplification of dark-area noise in the multi-channel image frame 504. Gamma correction typically occurs by applying a nonlinear function to image data. The gamma curve with initial linearity function 506 here supports the use of gamma correction where a portion of the gamma curve is linear, which helps to avoid amplifying dark-area noise. The remainder of the gamma curve may be nonlinear, which allows for the brightening of other image contents. This results in a corrected multi-channel image frame, where the corrected multi-channel image frame 504 includes RGB channels 508 and a white channel 510.

The RGB channels 508 are provided to an RGB-to-Y conversion function 512, which generally operates to convert the RGB data into luminance or luma data (Y). The RGB-to-Y conversion function 512 may use any suitable technique to convert RGB data into Y data. In some embodiments, the RGB-to-Y conversion function 512 calculates Y data values from RGB data values as follows:

$$Y = 0.2126 \times R' + 0.7152 \times G' + 0.0722 \times B' \quad (5)$$

Here, R', G', and B' respectively represent red, green, and blue data values as output from the gamma curve with initial linearity function 506. The RGB-to-Y conversion function 512 here generates data in a Y channel 514, which is provided (along with the white channel 510) to a brightness equalization function 516.

Since the white channel 510 can have a different brightness level compared to the RGB channels 508 and the Y channel 514, the brightness equalization function 516 generally operates to equalize the brightness level of the white channel 510. The brightness equalization function 516 may use any suitable technique to equalize the brightness level of the white channel 510. In some embodiments, the brightness equalization function 516 calculates equalized white data values ($W_{eq}$) as follows:

$$W_{eq} = W^\gamma \quad (6)$$

where:

$$\gamma = \log(Y_{median})/\log(W_{median}) \quad (7)$$

Here, $Y_{median}$ and $W_{median}$ respectively represent the median value of the Y channel 514 and the median value of the white channel 510. The brightness equalization function 516 here generates data in an equalized white channel 518, which is provided (along with the Y channel 514) to a filtering function 520.

The filtering function 520 generally operates to filter the Y channel 514 based on the equalized white channel 518. In some cases, for example, the filtering function 520 may implement a guided filter, which filters the Y channel 514 while using the equalized white channel 518 as a guide map. However, the filtering function 520 may use any other suitable technique to filter image data. The result generated in FIG. 5 is a structure image ($Y_F$) 522, which generally represents the structure captured in the image data of the image frame 302. Here, the structure image 522 may represent the luminance or luma data generated by the RGB-to-Y conversion function 512 and filtered by the filtering function 520.

The structure image 522 can be provided to the gradient structure tensor function 404, such as for use in generating orientation, gradient strength, and coherence estimates for the image frame 302. In some embodiments, for example, a gradient structure tensor G of an image I can be expressed as follows:

$$G = \begin{bmatrix} G_{xx} & G_{xy} \\ G_{xy} & G_{yy} \end{bmatrix} \quad (8)$$

where the components of the gradient structure tensor G can be expressed as follows:

$$G_{xx} = E[I_x^2] \quad (9)$$

$$G_{yy} = E[I_y^2] \quad (10)$$

$$G_{xy} = E[I_x I_y] \quad (11)$$

In the above equations, E[ ] represents mathematical expectation (which can be approximated by averaging over a local window), and $I_x$ and $I_y$ respectively represent a gradient image with respect to x and y (meaning they are partial derivatives of an image I with respect to x and y). This gradient structure tensor G can be used by the gradient structure tensor function 404 in the following manner. The eigenvalues of the gradient structure tensor G can be determined as follows:

$$\lambda_{1,2} = \frac{1}{2}\left[G_{xx} + G_{yy} \pm \sqrt{(G_{xx} - G_{yy})^2 + 4G_{xy}^2}\right] \quad (12)$$

where $\lambda_1$ represents the dominant eigenvalue and $\lambda_2$ represents the secondary eigenvalue. With this, the gradient structure tensor function 404 may determine an orientation θ, a coherence C, and a strength S of image data, such as in the following manner:

$$\theta = 0.5 \arctan \frac{2G_{xy}}{G_{yy} - G_{xx}} \quad (13)$$

$$C = \frac{\lambda_1 - \lambda_2}{\lambda_1 + \lambda_2} \quad (14)$$

$$S = \lambda_1 \quad (15)$$

In particular embodiments, these values may be determined for each point (pixel) of the structure image 522. Note, however, that the gradient structure tensor function 404 may use any other suitable tensor and determine orientation, strength, and coherence estimates or other characteristics of image data in any other suitable manner.

Figure 6:
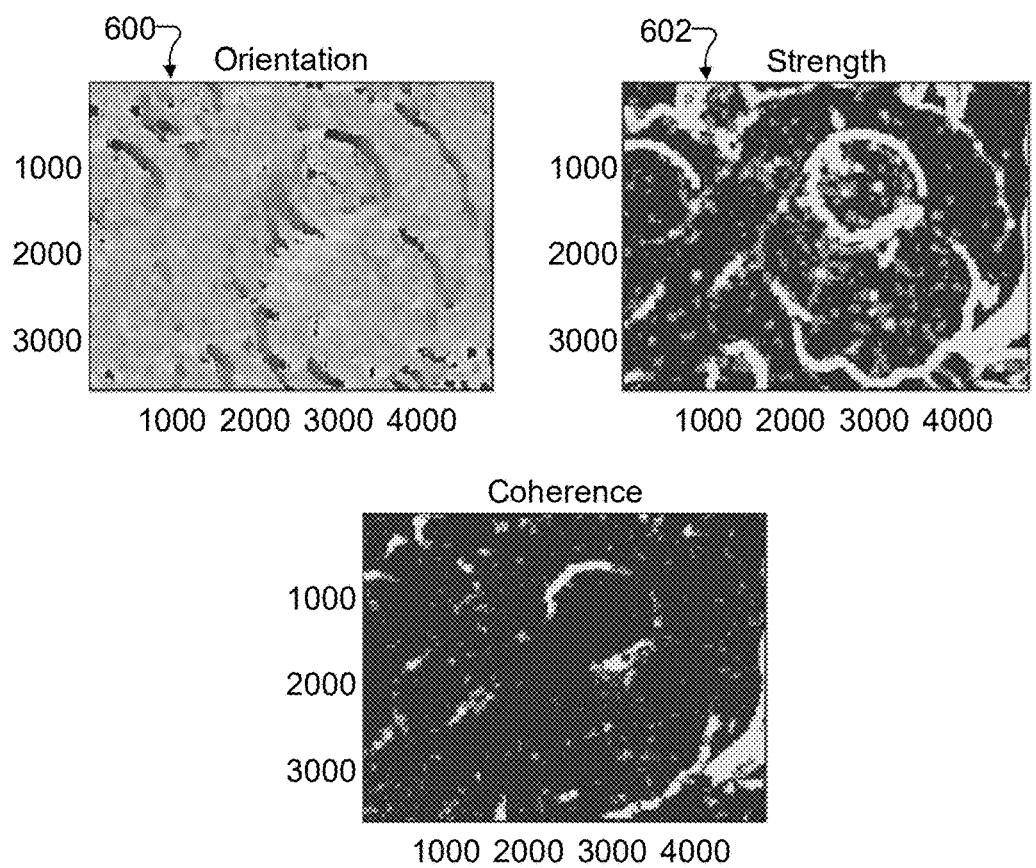
FIG. 6 illustrates example values that may be generated by a gradient structure tensor function in the warp and interpolation function of FIG. 4 according to this disclosure.

FIG. 6 illustrates example values that may be generated by the gradient structure tensor function 404 in the warp and interpolation function 308 of FIG. 4 according to this disclosure. More specifically, FIG. 6 contains a graph 600 identifying orientation estimates, a graph 602 identifying strength estimates, and a graph 604 identifying coherence estimates for a specific image frame. In this particular example, the estimates are generated for an image frame capturing a flower. As a result, the orientation estimates in the graph 600 tend to indicate that the individual petals are generally flat (have no specific orientation), the strength estimates in the graph 602 tend to identify edges of different petals of the flower, and the coherence estimates in the graph 604 tend to indicate that the edges are often relatively far apart.

In some embodiments, the kernel selection function 406 can use the estimates generated by the gradient structure tensor function 404 to select kernels to be used to filter image data. For example, based on the gradient strength, coherence, and orientation estimates, the kernel selection function 406 may select narrower filters that are not oriented in any particular direction for textured areas of a scene or may select filters with definite orientations for use along edges in the scene. As a particular example, the kernel selection function 406 may select one or more kernels from one or more banks of predefined kernels based on the gradient strength, coherence, and orientation estimates.

Figure 7:
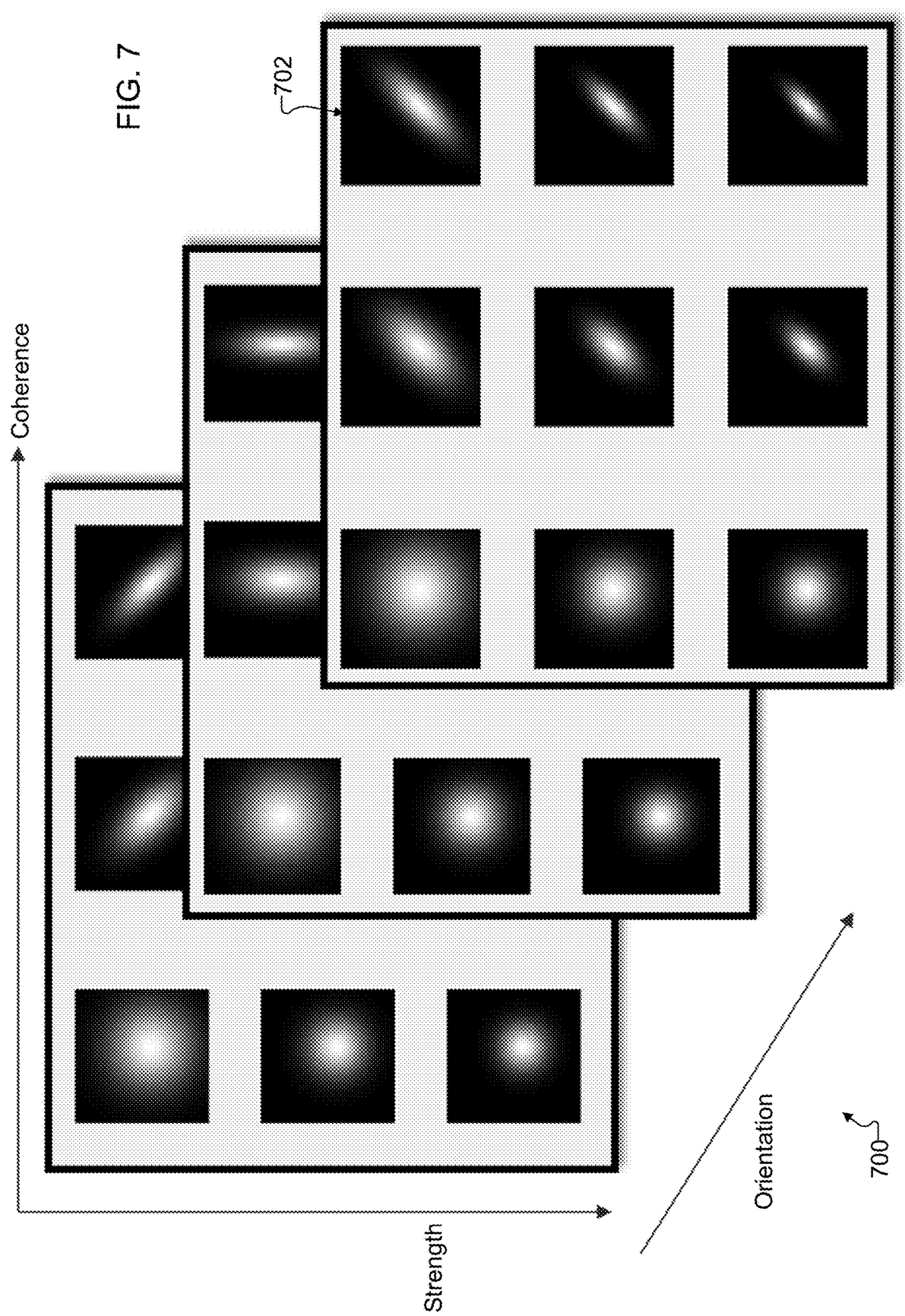
FIG. 7 illustrates an example kernel bank that may be used by a kernel selection function in the warp and interpolation function of FIG. 4 according to this disclosure.

FIG. 7 illustrates an example kernel bank 700 that may be used by the kernel selection function 406 in the warp and interpolation function 308 of FIG. 4 according to this disclosure. As shown in FIG. 7, the bank 700 includes a number of kernels 702, where each kernel 702 defines how image data can be filtered and where different kernels 702 define different ways in which image data can be filtered. As can be seen here, the kernels 702 tend to get smaller with strength so that edges of objects can be filtered using smaller kernel sizes, while flatter regions in an image frame can be filtered using larger kernel sizes. The kernels 702 also tend to get thinner and more elongated with coherence so that gradients oriented in the same direction can be preserved better during filtering. The directions of the kernels 702 may vary based on the angle of orientation of the gradients so that the filtering can be performed along a gradient's direction of orientation (if there is one). Thus, the kernel selection function 406 can use the gradient strength, coherence, and orientation estimates of image data in order to select appropriate kernels for the filters 408-414 used the filter the image frames 302 and 304.

Note that while each location in the bank 700 shows a single kernel 702, it is possible for each location in the bank 700 to include or be associated with multiple kernels 702. For example, multiple kernels 702 may be associated with the same gradient strength, coherence, and orientation estimates, where different ones of the kernels 702 are used with different ones of the filters 408-414. When processing Bayer image data, for instance, the green channel can have a different sampling pattern than the red and blue channels, so different kernels may be used with the green filter 410 and with the red and blue filters 408, 412. In other cases, there may be multiple banks 700 of kernels 702, such as one bank 700 per color channel, and kernels 702 may be selected from the appropriate banks 700 for use in the corresponding filters 408-414.

In some embodiments, the gradient structure tensor function 404 and the kernel selection function 406 may operate as follows. The gradient structure tensor function 404 can select a pixel in the structure image 522, measure any gradients (such as in the x and y directions) within a small window around the selected pixel, and determine the strength, coherence, and orientation estimates for the selected pixel using the pixel values within the window. Each strength, coherence, and orientation estimate can have a calculated numerical value, and the kernel selection function 406 may use that value to identify one of multiple bins or ranges into which the numerical value falls. The kernel selection function 406 may also use the bin or range for the strength estimate, the bin or range for the coherence estimate, and the bin or range for the orientation estimate to form an index into at least one bank 700, and the kernel(s) 702 identified by the index may be selected for use in filtering image data. This process can be repeated for some, many, or all pixels in the structure image 522.

Note that one or more kernels 702 selected for use in filtering a specific portion of an image frame 302 or 304 can be applied independently to the different color channels of the image frame 302 or 304, so each color channel is filtered independently of the other color channels. Standard demosaicing techniques often simply use the green channel to improve the red and blue channels. However, in embodiments of this disclosure, the color channels are filtered separately to generate independent image frames that can be blended together to reduce or eliminate aliasing artifacts. Again, note that different kernels 702 may be selected for use in filtering different portions of an image frame 302 or 304, such as when the different portions of the image frame 302 or 304 are associated with different gradient strength, coherency, and orientation estimates (or any subset thereof). This allows individual portions of the image frame 302 or 304 to be filtered more effectively based on the image content of those individual portions.

While the embodiments described above have demonstrated the use of gradient strength, coherence, and orientation estimates to select kernels for use, other or additional considerations may be used when selecting kernels for use. For example, semantic classes refer to classes or types of image content that may be present in a captured image frame of a scene. Examples of semantic classes may include people, animals, trees/shrubs/other foliage, buildings/houses/other structures, the ground, the sky, and water. Semantic classes may be used instead of or in addition to using strength, coherence, and orientation estimates in order to select kernels. As a particular example, a semantic map may be generated for a reference frame or other image frame, where the semantic map estimates the type of image content at each pixel of the image frame. One or more kernels may be selected for use in filtering the image frame based on which type(s) of image content is/are present and where in the image frame. As another example, edge detection may be used to identify edges of objects or scenery within a reference frame or other image frame, and an edge map that identifies the detected edges may be generated. One or more kernels may be selected based on the edges (or lack thereof) detected within the image frame. In general, any suitable factors or any combinations of suitable factors may be used to select kernels for use in filtering image data.

Returning to FIG. 4, as noted above, each filter 408-414 may represent a bilateral interpolation filter in some embodiments of the warp and interpolation function 308, 310. A bilateral interpolation filter provides an edge-preserving interpolation of pixels in a source image frame (up to an edge definition) in order to fill in a pixel's value in a destination image frame. For the filters 408-414, each filter 408-414 implemented as a bilateral interpolation filter can provide an edge-preserving interpolation of pixels in a source image frame (the image frame 302 or 304) in order to fill in each pixel's value in a destination image frame (one of the R, G, B, or W outputs 416). As a particular example, for a specified color channel (the green channel in this example), a value output by the filter 410 for a pixel with coordinates (p, q) in a destination image frame may expressed as follows:

$$I_G^{BF}(p) = \frac{1}{W(p)} \sum_{q \in w(p)} G_{\sigma_S}(\|p-q\|) G_{\sigma_R}(|I_G(p) - I_G(q)|) I_G(q) \quad (16)$$

Here, $G_{\sigma_S}$ and $G_{\sigma_R}$ respectively represent Gaussian weights for space and range, and w represents a weight normalization. Similar expressions may be used for the other filters 408, 412, 414 that are implemented as bilateral interpolation filters.

Figure 8:
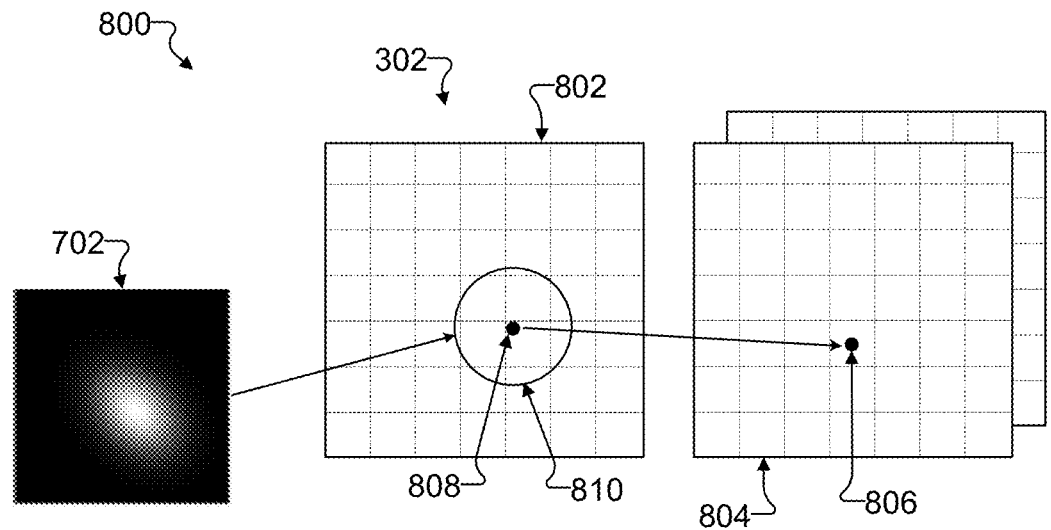
FIG. 8 illustrates example operation of a bilateral interpolation filter in the warp and interpolation function of FIG. 4 according to this disclosure.

FIG. 8 illustrates example operation 800 of a bilateral interpolation filter 408-414 in the warp and interpolation function 308 of FIG. 4 according to this disclosure. As shown in FIG. 8, a selected kernel 702 can be applied to an image frame 302. In this example, the selected kernel 702 is being applied to a window 802 of pixels within the image frame 302. The window 802 here represents a 7×7 window of pixels, although windows of other sizes may be used. A corresponding window 804 is associated with a destination image frame, and multiple destination image frames may be generated (such as when different destination image frames represent different single-color channel image frames generated in the outputs 416).

A bilateral interpolation filter can be used to estimate the values at pixel locations within each destination image frame. In FIG. 8, the bilateral interpolation filter is being used to specifically identify the pixel value within a destination image frame at a specified pixel location 806. The pixel location 806 is said to reside at coordinates (x, y), where x and y are integer values. The pixel value associated with the pixel location 806 can be determined by interpolating pixel values around a pixel location 808 in the source image frame, where the pixel location 808 is related to the pixel location 806 (such as when both pixel locations 806 and 808 represent the same point of a captured scene). However, the pixel location 808 in the source image frame likely does not have integer coordinates, such as due to the warping needed to align the image frames. The pixel location 808 is said to reside at coordinates (u, v), where u and v are typically non-integer values. Thus, the bilateral interpolation filter may operate as follows.

The alignment function 206 can provide one or more alignment maps as described above, where each alignment map defines how image data should be warped to more closely align one or more features in two or more image frames. In some embodiments, the alignment function 206 can provide (or the demosaic-warp function 208 can calculate) inverse mappings $f_x^{-1}$ and $f_y^{-1}$ that can be used to (among other things) map the pixel location 806 to the pixel location 808. As a result, when given a pixel location 806 at coordinates (x, y) in the destination image frame, the inverse mappings $f_x^{-1}$ and $f_y^{-1}$ can be used to calculate the coordinates (u, v) of the corresponding pixel location 808 in the source image frame. Once the coordinates (u, v) of the corresponding pixel location 808 are known, the bilateral interpolation filter performs interpolation using one or more neighboring source pixels around the pixel location 808 in order to generate the pixel value for the pixel location 806. The one or more neighboring source pixels can be included within a specified area 810 around the pixel location 808, where the specified area 810 is defined by the selected kernel 702.

Among other things, this approach allows for spatial interpolation that can capture the spatial relationships between a fractional source pixel and its integer neighbors. In some embodiments, the operation 800 of the bilateral interpolation filter as shown in FIG. 8 may be expressed as follows:

```
for (int x = 0; x < xmax; x++) {
    for (int y = 0; y < ymax; y++) {
        float u = f_x^{-1}(x, y);
        float v = f_y^{-1}(x, y);
        dst(x, y) = resample_src(u, v, w)
    }
}
```

Here, w refers to the radius of the specified area 810. Also, dst(x, y) refers to the pixel value at the (x, y) pixel location 806, and resample_src( ) refers to a function that performs an interpolation using pixel values around the (u, v) pixel location 808 within the radius of the specified area 810. This process may be repeated over all x and y integer values (up to maximum values of xmax and ymax, respectively) in order to produce pixel values for all pixel locations 806 in the window 804. For each x and y combination identifying a pixel location 806, the process identifies the u and v coordinates for the corresponding pixel location 808 and performs an interpolation around those u and v coordinates.

In addition to the spatial dimension, a bilateral interpolation filter can consider the range relationship between a fractional source pixel and its integer neighbors. This can help to preserve small edges contained in an image frame 302 or 304 since spatial-only interpolation may tend to leave small edges appearing smudgy. The range relationship considered by the bilateral interpolation filter can be achieved using suitable weights in the interpolation calculations. In general, spatial interpolation of image data can follow an interpolation path P, which in some cases may generally represent a path of decreasing spatial weights. In some embodiments, this can be expressed as follows:

$$w_i \geq w_j, i<j, \forall i,j \in P \tag{17}$$

This indicates that a spatial-only fractional (source) pixel can be estimated by accumulating pixel values $\breve{p}$ (of the same type) and weights $\breve{w}$ along the path of interpolation P. Note that this path P does not have to be spatially contiguous.

Figure 9:
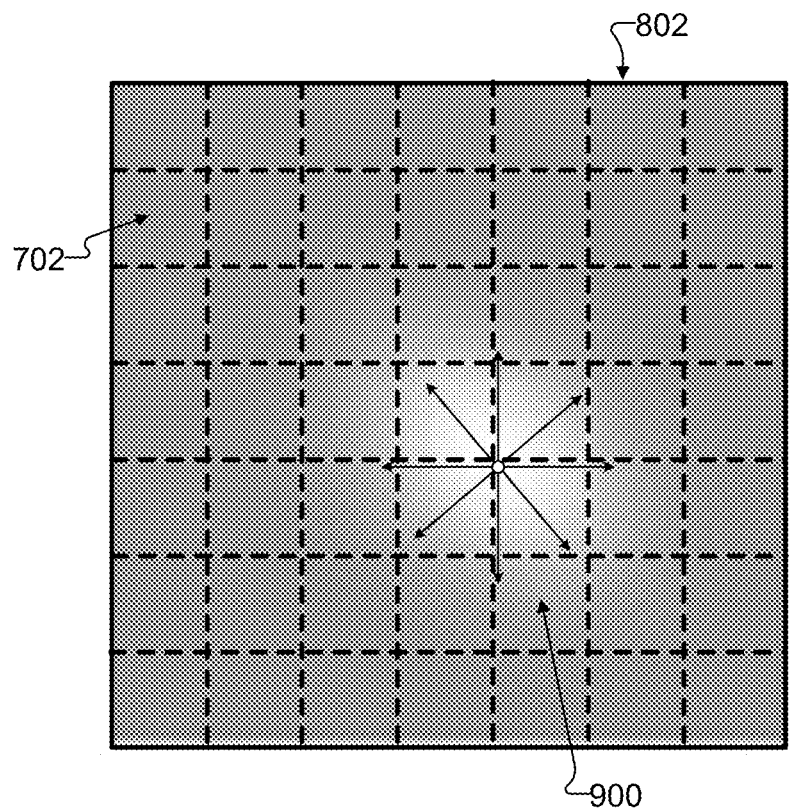
FIGS. 9 and 10 illustrate example interpolation paths that may be used by a bilateral interpolation filter in the warp and interpolation function of FIG. 4 according to this disclosure.
Figure 10:
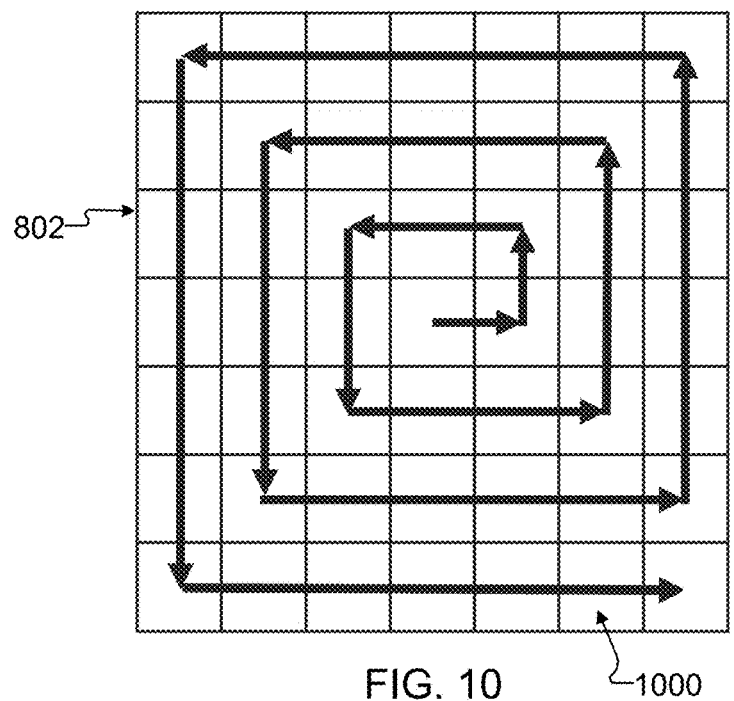

FIGS. 9 and 10 illustrate example interpolation paths 900 and 1000 that may be used by a bilateral interpolation filter 408-414 in the warp and interpolation function 308 of FIG. 4 according to this disclosure. As shown in FIG. 9, the selected kernel 702 is shown as being positioned behind the window 802 of pixels within the image frame 302. The interpolation path 900 shown in FIG. 9 is generally defined as starting from a center of a blob defined by the selected kernel 702 and moving outward, where the center of the blob defined by the selected kernel 702 has a higher spatial weight and positions moving away from the blob defined by the selected kernel 702 generally have lower spatial weights. Using this approach, a partial accumulation up to a location j of a color channel c∈ {R, G, B(, W)} (which indicates that the color channel may be the R, G, or B channel or in some cases may be the W channel) along the interpolation path P may be expressed as follows: t,? t,? Spatial accumulators of the first (highest-weight) t pixels may be used to estimate the reference $\overline{p_{c,t}}$ for range-based weighting, which may be expressed as follows:

$$\overline{p_{c,t}} = \frac{\widetilde{p_{c,t}}}{\widetilde{w_{c,t}}} \tag{20}$$

In some embodiments, the range-based weighting may use a Gaussian model. The combined spatial- and range-based interpolation of the fractional source pixel $\overline{p_c}$ for channel c may therefore be expressed as follows:

$$\widetilde{p_c} = \widetilde{p_{c,t}} + \sum_{i>t} p_i * w_i * \exp\left(-\frac{(p_i - \overline{p_{c,t}})^2}{2\sigma^2}\right), i \in P \cap c \tag{21}$$

$$\widetilde{w_c} = \widetilde{w_{c,t}} + \sum_{i>t} w_i * \exp\left(-\frac{(p_i - \overline{p_{c,t}})^2}{2\sigma^2}\right), i \in P \cap c \tag{22}$$

$$\overline{p_c} = \frac{\widetilde{p_c}}{\widetilde{w_c}} \tag{23}$$

Note, however, that other interpolation paths may be used by a bilateral interpolation filter. For example, the interpolation path 1000 shown in FIG. 10 begins at the center of the window 802 of pixels and moves in a counter-clockwise swirl pattern from the center of the window 802 to the outer edges of the window 802. This approach may be simpler than using the interpolation path 900 and may help to avoid the need to sort local pixels within a kernel according to their weights. While the range reference estimate $\overline{p_{c,t}}$ generated using the interpolation path 1000 may contain certain spatial biases, this may be acceptable in some cases (such as when this issue is outweighed by the computational savings).

It should be noted that the functions shown in or described with respect to FIGS. 3 through 10 can be implemented in an electronic device 101, server 106, or other device in any suitable manner. For example, in some embodiments, at least some of the functions shown in or described with respect to FIGS. 3 through 10 can be implemented or supported using one or more software applications or other software instructions that are executed by the processor 120 of the electronic device 101, server 106, or other device. In other embodiments, at least some of the functions shown in or described with respect to FIGS. 3 through 10 can be implemented or supported using dedicated hardware components. In general, the functions shown in or described with respect to FIGS. 3 through 10 can be performed using any suitable hardware or any suitable combination of hardware and software/firmware instructions.

Although FIGS. 3 through 10 illustrate one example of a demosaic-warp function 208 in the image processing architecture 200 of FIG. 2 and related details, various changes may be made to FIGS. 3 through 10. For example, various functions shown in FIGS. 3 through 5 may be combined, further subdivided, replicated, omitted, or rearranged and additional functions may be added according to particular needs. Also, the graphs shown in FIG. 6, the kernel bank shown in FIG. 7, the interpolation shown in FIG. 8, and the interpolation paths shown in FIGS. 9 and 10 are examples only and can vary depending on the circumstances. For instance, the graphs of strength, coherence, and orientation estimates can vary based on the actual image frame being processed, the kernels contained in the kernel bank may vary depending on the implementation, and any suitable interpolation path (if any) may be used during an interpolation operation.

Figure 11:
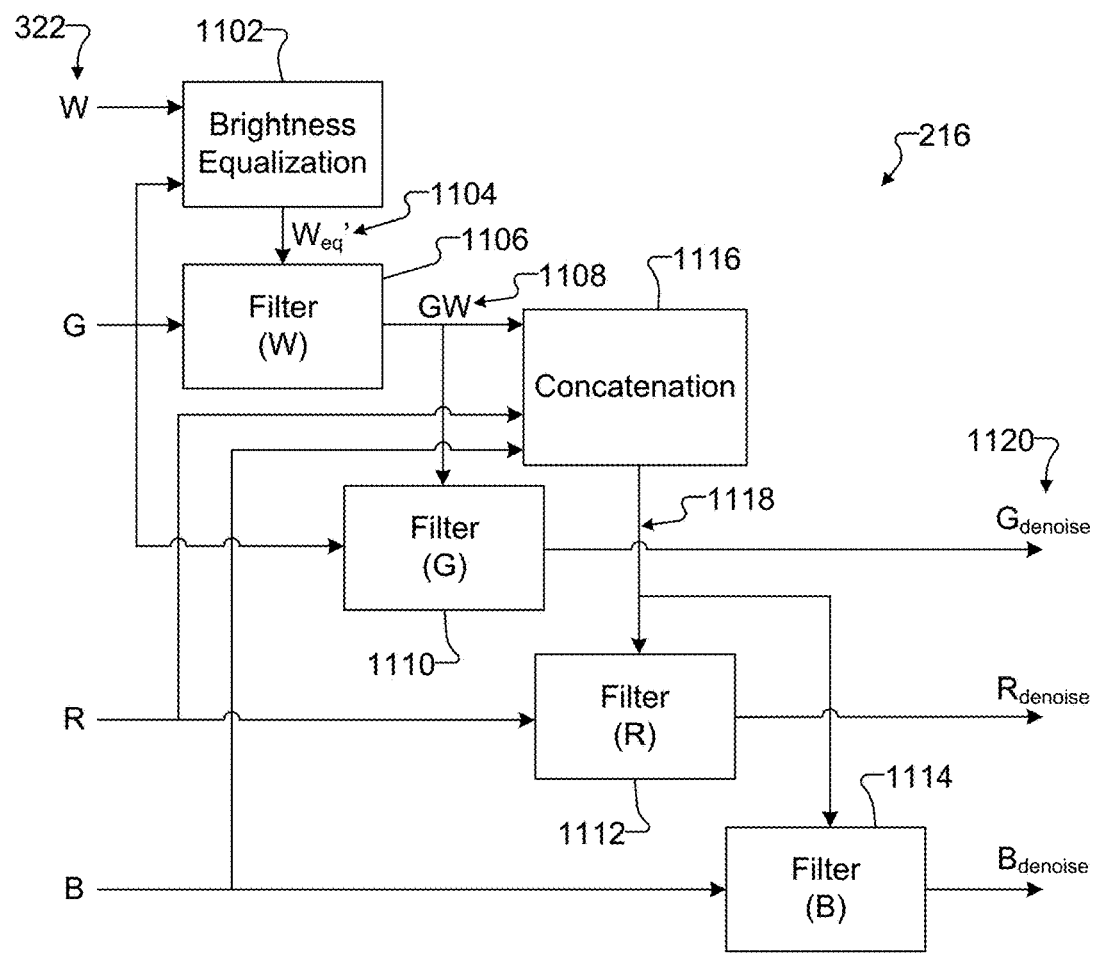
FIG. 11 illustrates a first example interband denoising function in the image processing architecture of FIG. 2 according to this disclosure.

FIG. 11 illustrates a first example interband denoising function 216 in the image processing architecture 200 of FIG. 2 according to this disclosure. As shown in FIG. 11, the interband denoising function 216 can receive blended image frames generated by the single-exposure blending function 212 and the multi-exposure blending function 214. In this particular example, the interband denoising function 216 receives blended RGB image frames 322 as inputs, where each blended RGB image frame 322 is received in its different color channels (R, G, B, and optionally W). The interband denoising function 216 generally operates to remove aliasing artifacts and noise in subsampled color channels (the red and blue channels) using higher-SNR signals from one or more higher-sampled color channels (such as the green channel and/or the white channel).

In this example, the white and green channels of the blended RGB image frame 322 are provided to a brightness equalization function 1102, which generally operates to equalize the brightness level of the white channel compared to the green channel. The brightness equalization function 1102 may use any suitable technique to equalize the brightness level of the white channel. In some embodiments, the brightness equalization function 1102 calculates equalized white data values ($W_{eq}'$) as follows:

$$W_{eq}' = W^\gamma \quad (24)$$

where:

$$\gamma = \log(G_{median})/\log(W_{median}) \quad (25)$$

Here, $G_{median}$ and $W_{median}$ respectively represent the median value of the green channel of the blended RGB image frame 322 and the median value of the white channel of the blended RGB image frame 322. The brightness equalization function 1102 here generates data in an equalized white channel 1104, which is provided (along with the G channel) to a filtering function 1106.

The filtering function 1106 generally operates to filter the green channel of the blended RGB image frame 322 based on the equalized white channel 1104. In some cases, the filtering function 1106 may be implemented using a guided filter, which filters the green channel of the blended RGB image frame 322 while using the equalized white channel 1104 as a guide map. However, the filtering function 1106 may use any other suitable technique to filter image data. The filtering function 1106 thereby generates a filtered version of the green channel as a green-white (GW) channel 1108. In other embodiments, the brightness equalization function 1102 and the filtering function 1106 may be omitted if the blended RGB image frame 322 includes RGB channels only (and not a white channel).

Three additional filtering functions 1110, 1112, and 1114 are respectively used to filter the green, red, and blue channels of the blended RGB image frame 322. In some cases, each filtering function 1110, 1112, and 1114 may be implemented using a guided filter. However, each filtering function 1110, 1112, and 1114 may use any other suitable technique to filter image data. For the green channel, the filtering function 1110 when implemented using a guided filter may perform a self-guided denoise operation (if the white channel is not present) or perform sampling/interpolation/aliasing removal using the GW channel 1108 as a guide map. Each filtering function 1112 and 1114 when implemented using a guided filter may function as a three-channel guided filter, where a combination of the GW channel 1108 and the red and blue channels of the blended RGB image frame 322 is used as a guide map. In this example, a concatenation function 1116 can combine the GW channel 1108 with the red and blue channels of the blended RGB image frame 322 to produce a guide map 1118 used by the filtering functions 1112 and 1114. This allows guided filtering to be applied to the red and blue channels using a single-channel fusion of the GW channel 1108 and the red and blue channels. Among other things, this can help to ensure that chroma edges are optimally preserved during the filtering process. The filtering functions 1110, 1112, and 1114 here generate outputs 1120, which represent denoised versions of the red, green, and blue channels of each blended RGB image frame 322. These outputs 1120 may therefore represent the denoised RGB image frames provided to the interband sharpening function 218.

As noted above, in some embodiments, each of the filtering functions 1106 and 1110 may be implemented using a guided filter. In some embodiments, each of these guided filters may be based on a local linear model between a filtering output q and a guidance image I at every pixel i. This may be expressed as follows:

$$q_i = a_k I_i + b_k, \forall i \in w_k \quad (26)$$

where $a_k$ and $b_k$ represent linear coefficients to be optimized for a local window $w_k$ centered at pixel k. The filtering output can be optimized to be closest to an input image p in mean-square sense. In some cases, the linear coefficients can be expressed as follows:

$$a_k = \frac{\frac{1}{|w_k|}\sum_i I_i p_i - \bar{I}_k \bar{p}_k}{\sigma_k^2 + \varepsilon} \quad (27)$$

$$b_k = \bar{p}_k - a_k \bar{I}_k \quad (28)$$

where $\sigma_k^2$ represents the local variance of the guidance image I in the local window $w_k$.

Also, as noted above, in some embodiments, each of the filtering functions 1112 and 1114 may be implemented using a three-channel guided filter. In some embodiments, each of these three-channel guided filters may represent an extension of a guided filter, where the guidance image I has three channels. In some cases, the operation of each three-channel guided filter may be expressed as follows:

$$q_i = a_k^T I_i + b_k, \forall\, i \in w_k \tag{29}$$

$$a_k = \left(\sum\nolimits_k + \epsilon U\right)^{-1}\left(\frac{1}{|w_k|}\sum\nolimits_i I_i p_i - \bar{I}_i \bar{p}_i\right) \tag{30}$$

$$b_k = \bar{p}_k - a_k^T \bar{I}_k \tag{31}$$

where $\Sigma_k$ represents a 3×3 covariance matrix of the guidance image I in the local window $w_k$ and U represents a 3×3 identity matrix.

In other embodiments, one or more of the filtering functions 1006, 1110-1114 may each be implemented using a cross-bilateral filter. As a particular example, the filtering function 1106 may be used to generate output values in the GW channel 1108 as follows:

$$I_{G|W}^{CBF}(p) = \frac{1}{W(p)}\sum\nolimits_{q \in w(p)} G_{\sigma_S}(\|p - q\|) G_{\sigma_R}(|I_W(p) - I_W(q)|) I_G(q) \tag{32}$$

Similar expressions may be used for the other filtering functions 1110-1114 that are implemented as cross-bilateral filters.

Figure 12:
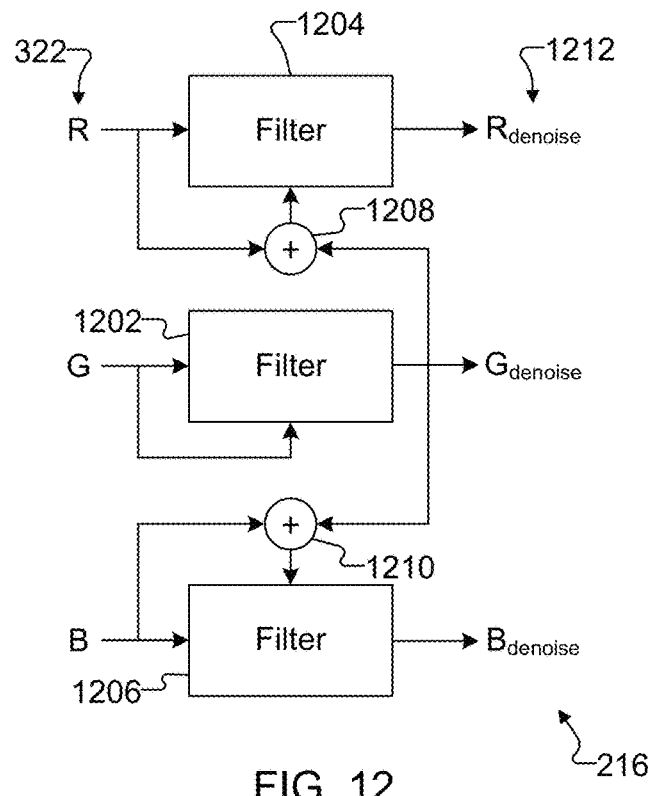
FIG. 12 illustrates a second example interband denoising function in the image processing architecture of FIG. 2 according to this disclosure.

While the approach shown in FIG. 11 may use two three-channel guided filtering functions 1112 and 1114, the use of three-channel guided filtering is not required. FIG. 12 illustrates a second example interband denoising function 216 in the image processing architecture 200 of FIG. 2 according to this disclosure. As shown in FIG. 12, the interband denoising function 216 in this example receives the red, green, and blue channels of a blended RGB image frame 322 and passes the channels to three filtering functions 1202, 1204, and 1206. In some cases, each of the filtering functions 1202, 1204, and 1206 may be implemented using a guided filter. However, each filtering function 1202, 1204, and 1206 may use any other suitable technique to filter image data.

In those embodiments using guided filters, the filtering function 1202 filters the green channel using itself as a guide map. The filtering functions 1204 and 1206 respectively filter the red and blue channels using a combination of (i) the red or blue channel and (ii) the filtered green channel that is output from the filtering function 1202. In this example, a concatenation function 1208 can combine the red channel and the filtered green channel to generate the guide map for the filtering function 1204, and a concatenation function 1210 can combine the blue channel and the filtered green channel to generate the guide map for the filtering function 1206. In some cases, the outputs from the concatenation functions 1208 and 1210 may be expressed as follows:

$$I_R = \frac{q_G + p_R}{2} \tag{33}$$

$$I_B = \frac{q_G + p_B}{2} \tag{34}$$

Here, qG represents data values in the filtered green channel, and pR and pB respectively represent data values in the unfiltered red and blue channels. The results of the filtering include outputs 1212, which represent denoised versions of the red, green, and blue channels. These outputs 1212 may therefore represent the denoised RGB image frames provided to the interband sharpening function 218.

When the filtering functions 1202, 1204, and 1206 are implemented using guided filters, each guided filter may operate in accordance with Equation (26) above. In some cases, a cost function can be minimized when using a guided filter as follow:

$$E(a_k, b_k) = \sum_{i \in \omega_k}\left((a_k I_i + b_k - p_i)^2 + \epsilon a_k^2\right) \tag{35}$$

The solution to this problem may be expressed as follows:

$$a_k = \frac{\frac{1}{|\omega|}\sum_{i \in \omega_k} I_i p_i - \mu_k \bar{p}_k}{\sigma_k^2 + \epsilon} \tag{36}$$

$$b_k = \bar{p}_k - a_k \mu_k \tag{37}$$

In these embodiments, when a combination of the green channel an another channel is used as a guide map, the edges from both channels appear in the filtered results due to the edge-preserving property of the guided filter.

Figure 13:
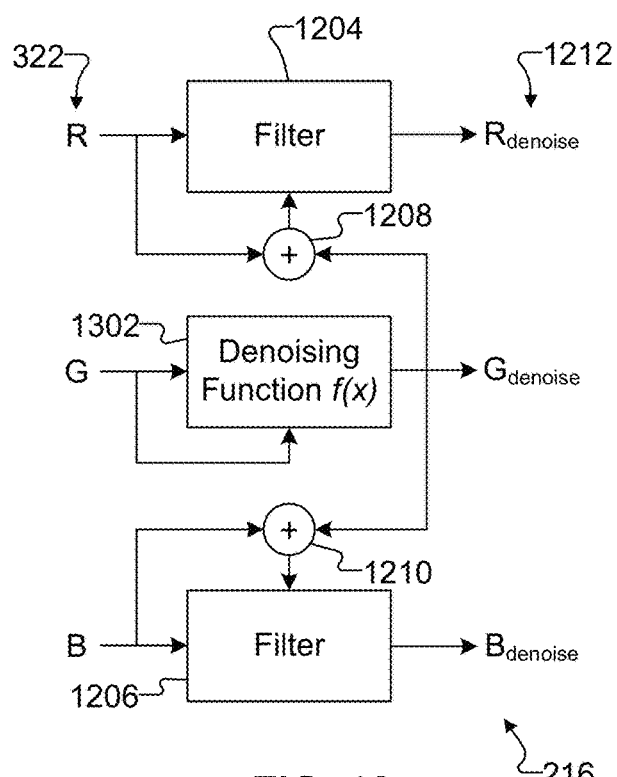
FIG. 13 illustrates a third example interband denoising function in the image processing architecture of FIG. 2 according to this disclosure.

Note that the filtering function 1202 is described above as being implemented in some embodiments using a guided filter that filters the green channel using the green channel itself as a guide map. However, using a guided filter with self-guidance may provide weak noise reduction in some cases. While it is possible to improve smoothing by increasing the noise reduction strength of a guided filter with self-guidance, this comes with a tradeoff related to blurriness (meaning larger noise reduction strengths come with more blurriness). FIG. 13 illustrates a third example interband denoising function 216 in the image processing architecture 200 of FIG. 2 according to this disclosure. In this example, the filtering function 1202 has been replaced by a green-channel denoising function 1302. The denoising function 1302 here ideally represents a denoising algorithm that can provide equivalent or better results relative to using a guided filter with self-guidance. Any suitable denoising algorithm may be used here to implement the denoising function 1302. In some embodiments, the denoising function 1302 may implement any suitable technique disclosed in U.S. Pat. No. 10,097,765 (which is hereby incorporated by reference in its entirety) to reduce noise in image data.

In the example shown in FIG. 13, the denoising function 1302 filters the green channel. The filtering functions 1204 and 1206 respectively filter the red and blue channels using a combination of (i) the red or blue channel and (ii) the filtered green channel that is output from the denoising function 1302. Here, the outputs from the denoising function 1302 may be expressed as follows:

$$q_G = f(p_G) \tag{38}$$

The outputs from the concatenation functions 1208 and 1210 may have the same form as shown in Equations (33) and (34). However, since the outputs from the concatenation functions 1208 and 1210 use the filtered green channel's data, improving the quality of the filtered green channel using the denoising function 1302 also improves the quality of the guide maps that are generated by the concatenation functions 1208 and 1210 and used by the filtering functions 1204 and 1206.

It should be noted that the functions shown in or described with respect to FIGS. 11 through 13 can be implemented in an electronic device 101, server 106, or other device in any suitable manner. For example, in some embodiments, at least some of the functions shown in or described with respect to FIGS. 11 through 13 can be implemented or supported using one or more software applications or other software instructions that are executed by the processor 120 of the electronic device 101, server 106, or other device. In other embodiments, at least some of the functions shown in or described with respect to FIGS. 11 through 13 can be implemented or supported using dedicated hardware components. In general, the functions shown in or described with respect to FIGS. 11 through 13 can be performed using any suitable hardware or any suitable combination of hardware and software/firmware instructions.

Although FIGS. 11 through 13 illustrate examples of an interband denoising function 216 in the image processing architecture 200 of FIG. 2, various changes may be made to FIGS. 11 through 13. For example, various functions shown in FIGS. 11 through 13 may be combined, further subdivided, replicated, omitted, or rearranged and additional functions may be added according to particular needs.

Figure 14:
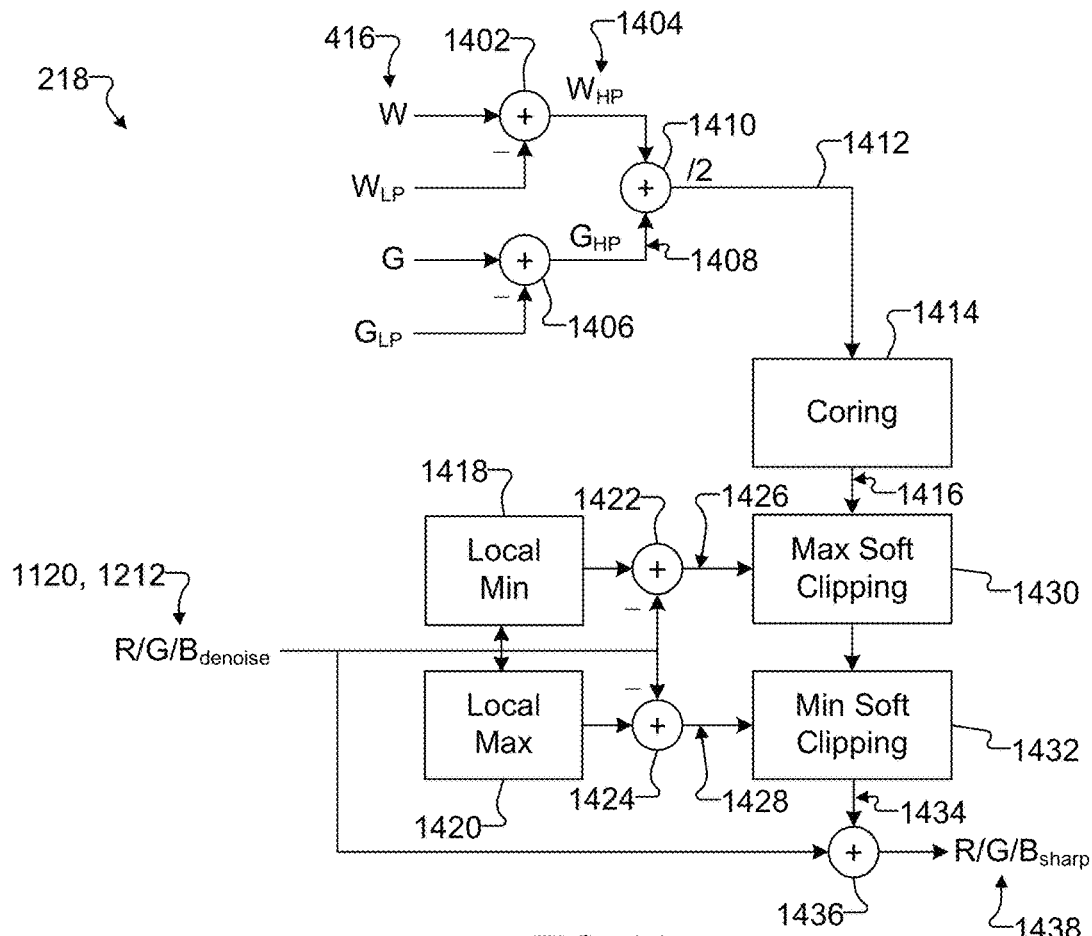
FIG. 14 illustrates an example interband sharpening function in the image processing architecture of FIG. 2 according to this disclosure.

FIG. 14 illustrates an example interband sharpening function 218 in the image processing architecture 200 of FIG. 2 according to this disclosure. While the interband denoising function 216 allows for strong filtering of subsampled channels to remove strong noise and sampling, interpolation, and aliasing artifacts, this can also remove high-frequency content in these subsampled channels, which can create blur. The interband sharpening function 218 is therefore used to transfer details from one or more higher-SNR and higher-sampled color channels back into the red and blue channels.

As shown in FIG. 14, the interband sharpening function 218 can receive various inputs, including the denoised RGB image frames generated by the interband denoising function 216 (represented by the denoised outputs 1120 or 1212) and certain color channels generated by the warp and interpolation function 308 (represented by certain outputs 416). A combining function 1402 subtracts the low-pass white channel information from the full white channel information generated by the warp and interpolation function 308 to produce a high-pass white ($W_{HP}$) channel 1404. Similarly, a combining function 1406 subtracts the low-pass green channel information from the full green channel information generated by the warp and interpolation function 308 to produce a high-pass green ($G_{HP}$) channel 1408. An averaging function 1410 combines the high-pass white channel 1404 with the high-pass green channel 1408 and averages the results, thereby producing a signal 1412 that represents the average high-frequency content contained in the white and green channels. Note, however, that if the white channel is omitted here, the combining function 1402 and the averaging function 1410 may be omitted, and the signal 1412 may represent the high-pass green channel 1408.

A coring function 1414 generally operates to suppress noisy high-frequency components contained in the signal 1412. For example, the coring function 1414 may implement a filter that helps to remove the noisy high-frequency components contained in the signal 1412. The coring function 1414 produces a signal 1416 that still predominantly identifies the high-frequency content of the white and green channels. As a particular example, the coring function 1414 may operate to produce results that are expressed as follows:

$$y = \begin{cases} 0, & x < t_1 \\ x \cdot \left( \frac{(|x| - t_1)}{t_2 - t_1} + t_1 \right), & t_1 \leq x \leq t_2 \\ x, & x > t_2 \end{cases} \quad (39)$$

where x represents the input signal 1412 to the coring function 1414, y represents the output signal 1416 from the coring function 1414, and $t_1$ and $t_2$ represent tuning thresholds.

The red, green, and blue channels of the denoised RGB image frames (the outputs 1120 or 1212) are provided to a local minimum function 1418, which identifies one or more local minima within the red, green, and blue channels. The red, green, and blue channels of the denoised RGB image frames are also provided to a local maximum function 1420, which identifies one or more local maxima within the red, green, and blue channels. Combining functions 1422 and 1424 can be used to combine the local minima and local maxima with the red, green, and blue channels, such as via subtraction. The resulting signals 1426 and 1428 are respectively provided to a maximum soft clipping function 1430 and a minimum soft clipping function 1432.

The clipping functions 1430 and 1432 generally operate to modify the signal 1416 (which again predominantly identifies the high-frequency content of the white and green channels) in order to limit the amount of high-pass overshoot (bright halo) around strong edges in the image data. For example, the clipping function 1432 may limit the amount of high-pass overshoot around strong edges given a local bound $x_{max}$ obtained from the local maximum function 1420 and an input signal x. In some embodiments, this can be expressed as follows:

$$y = \min\_\text{soft}\_\text{clip}(x_{max}, x) = \begin{cases} x, & x \leq x_{max} \\ \max(0, x - x_{max})^{0.5} + x_{max}, & x > x_{max} \end{cases} \quad (40)$$

where y represents the output signal 1428 from the clipping function 1432. Similarly, the clipping function 1430 may limit the amount of high-pass overshoot around strong edges given a local bound $x_{min}$ obtained from the local minimum function 1418 and an input signal x. In some embodiments, the operation of the clipping function 1430 may be defined as an inverse of the clipping function 1430, which may be expressed as follows:

$$y = \max\_\text{soft}\_\text{clip}(x_{min}, x) = -\min\_\text{soft}\_\text{clip}(-x_{min}, -x) \quad (41)$$

The operation of the clipping functions 1430 and 1432 results in the generation of a clipped signal 1434, which may identify modified (clipped) high-frequency content of the white and green channels. The clipped signal 1434 and the red, green, and blue channels are provided to a combining function 1436, which adds the clipped signal 1434 to the image data in the red, green, and blue channels. Essentially, this operates to add image details to the red and blue channels based on the high-frequency content of the green channel and/or the white channel without creating halo artifacts. This leads to the generation of outputs 1438, which include sharpened red, green, and blue channels. These outputs 1438 may therefore represent the sharpened RGB image frames provided to the interband demosaic function 220.

It should be noted that the functions shown in or described with respect to FIG. 14 can be implemented in an electronic device 101, server 106, or other device in any suitable manner. For example, in some embodiments, at least some of the functions shown in or described with respect to FIG. 14 can be implemented or supported using one or more software applications or other software instructions that are executed by the processor 120 of the electronic device 101, server 106, or other device. In other embodiments, at least some of the functions shown in or described with respect to FIG. 14 can be implemented or supported using dedicated hardware components. In general, the functions shown in or described with respect to FIG. 14 can be performed using any suitable hardware or any suitable combination of hardware and software/firmware instructions.

Although FIG. 14 illustrates one example of an interband sharpening function 218 in the image processing architecture 200 of FIG. 2, various changes may be made to FIG. 14. For example, various functions shown in FIG. 14 may be combined, further subdivided, replicated, omitted, or rearranged and additional functions may be added according to particular needs.

Figure 15:
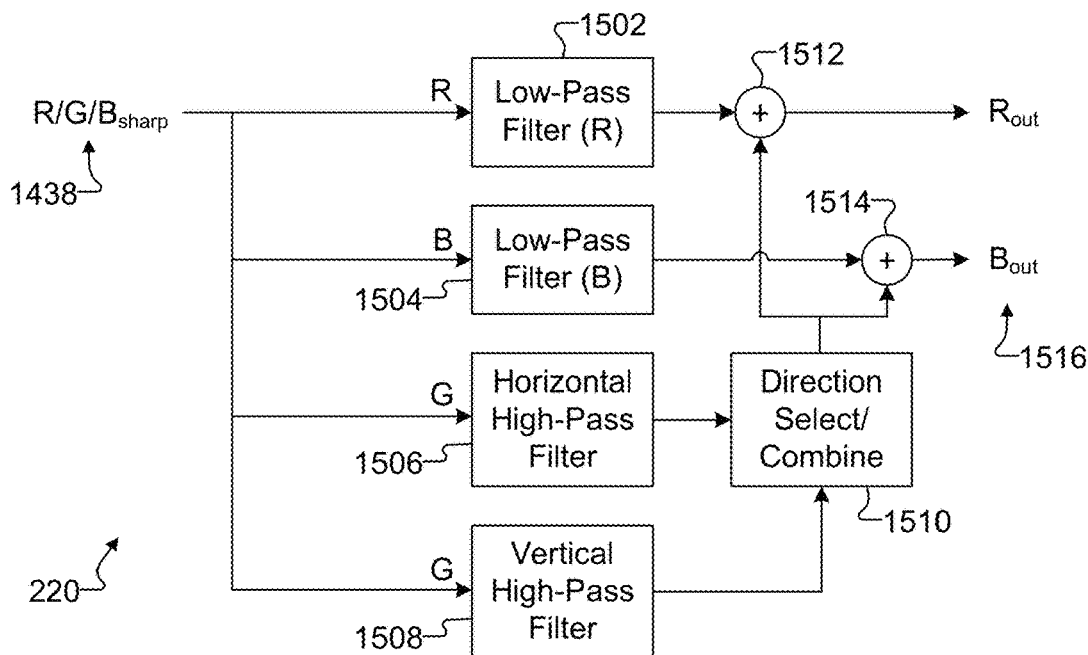
FIG. 15 illustrates an example interband demosaic function in the image processing architecture of FIG. 2 according to this disclosure.

FIG. 15 illustrates an example interband demosaic function 220 in the image processing architecture 200 of FIG. 2 according to this disclosure. In this example, the interband demosaic function 220 generally operates to combine low-frequency information from the sharpened red and blue image data with high-frequency information from the sharpened green image data in order to enhance the sharpened red and blue image data. As described above, the interband demosaic function 220 is performed after image frames are blended, which allows the equalization of the high-frequency content to be done using blended image frames having less artifacts and noise.

As shown in FIG. 15, the interband demosaic function 220 receives sharpened RGB image frames, such as the outputs 1438 representing the sharpened red, green, and blue channels of the sharpened RGB image frames. Low-pass filtering functions 1502 and 1504 are respectively used to filter the sharpened red channel and the sharpened blue channel, so the outputs of the low-pass filtering functions 1502 and 1504 generally represent low-pass red and low-pass blue filtered results (which are the low-frequency contents of the sharpened red and blue channels). High-pass filtering functions 1506 and 1508 are used to filter the sharpened green channel, so the outputs of the high-pass filtering functions 1506 and 1508 generally represent first and second high-pass green filtered results (which are the high-frequency contents of the sharpened green channel in different directions). More specifically, the high-pass filtering function 1506 is designed to filter image data in the horizontal direction, and the high-pass filtering function 1508 is designed to filter image data in the vertical direction.

The filtered green channel information is provided to a direction selection/combination function 1510, which generally operates to either (i) select and output the filtered green channel information from one of the high-pass filtering functions 1506 and 1508 or (ii) select, combine, and output the filtered green channel information from both of the high-pass filtering functions 1506 and 1508. For example, the outputs from the high-pass filtering functions 1506 and 1508 can be used as measures of edge energy along two directions (horizontal and vertical) in the sharpened green channel. The direction selection/combination function 1510 can determine whether or not the edge energies in the sharpened green channel are predominantly aligned horizontally or vertically (or neither). In some cases, this can be accomplished by having the direction selection/combination function 1510 select the larger of the edge energies and determine whether the larger edge energy exceeds a specified threshold. If so, the output from the high-pass filtering function 1506 and 1508 associated with the larger edge energy can be provided from the direction selection/combination function 1510. Otherwise, the direction selection/combination function 1510 can combine the outputs from both high-pass filtering function 1506 and 1508 and output the result.

Combining functions 1512 and 1514 respectively operate to combine the output from the direction selection/combination function 1510 with the sharpened red channel and the sharpened blue channel. For example, in some cases, the combining function 512 can add the output from the direction selection/combination function 1510 with the sharpened red channel, and the combining function 1514 can subtract the output from the direction selection/combination function 1510 with the sharpened blue channel. This results in the generation of outputs 1516, which represent equalized sharpened red and blue channels. More specifically, the outputs 1516 include red and blue channels in which high-frequency content has been added from the sharpened green channel, which helps to equalize the high-frequency content across the three color channels. The sharpened green channel and the equalized sharpened red and blue channels may collectively form equalized sharpened RGB image frames, which may be provided to the tone-mapping function 222 and/or the other post-processing function(s) 224 for additional processing if desired.

It should be noted that the functions shown in or described with respect to FIG. 15 can be implemented in an electronic device 101, server 106, or other device in any suitable manner. For example, in some embodiments, at least some of the functions shown in or described with respect to FIG. 15 can be implemented or supported using one or more software applications or other software instructions that are executed by the processor 120 of the electronic device 101, server 106, or other device. In other embodiments, at least some of the functions shown in or described with respect to FIG. 15 can be implemented or supported using dedicated hardware components. In general, the functions shown in or described with respect to FIG. 15 can be performed using any suitable hardware or any suitable combination of hardware and software/firmware instructions.

Although FIG. 15 illustrates one example of an interband demosaic function 220 in the image processing architecture 200 of FIG. 2, various changes may be made to FIG. 15. For example, various functions shown in FIG. 15 may be combined, further subdivided, replicated, omitted, or rearranged and additional functions may be added according to particular needs.

Figure 16B:
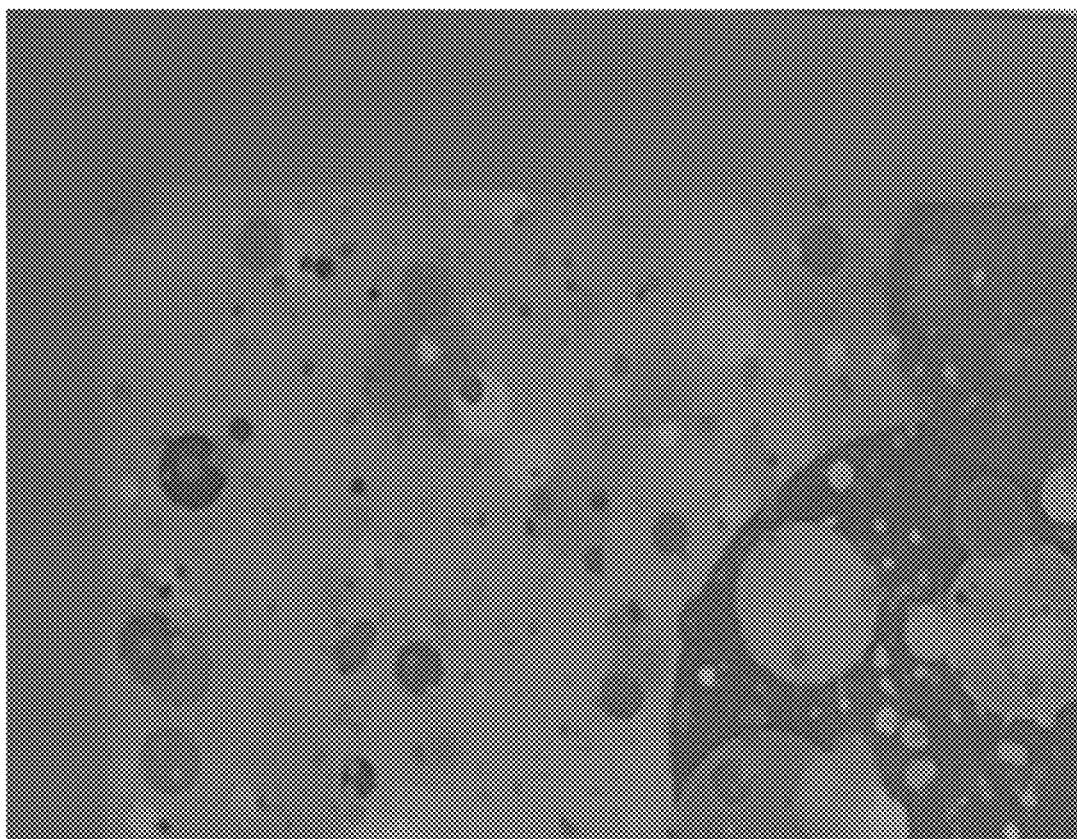
FIGS. 16A and 16B illustrate example results that may be obtained using an image processing architecture that supports multi-frame blending with intraband and interband multi-frame demosaicing and with interband denoising and interband sharpening according to this disclosure.
Figure 16A:
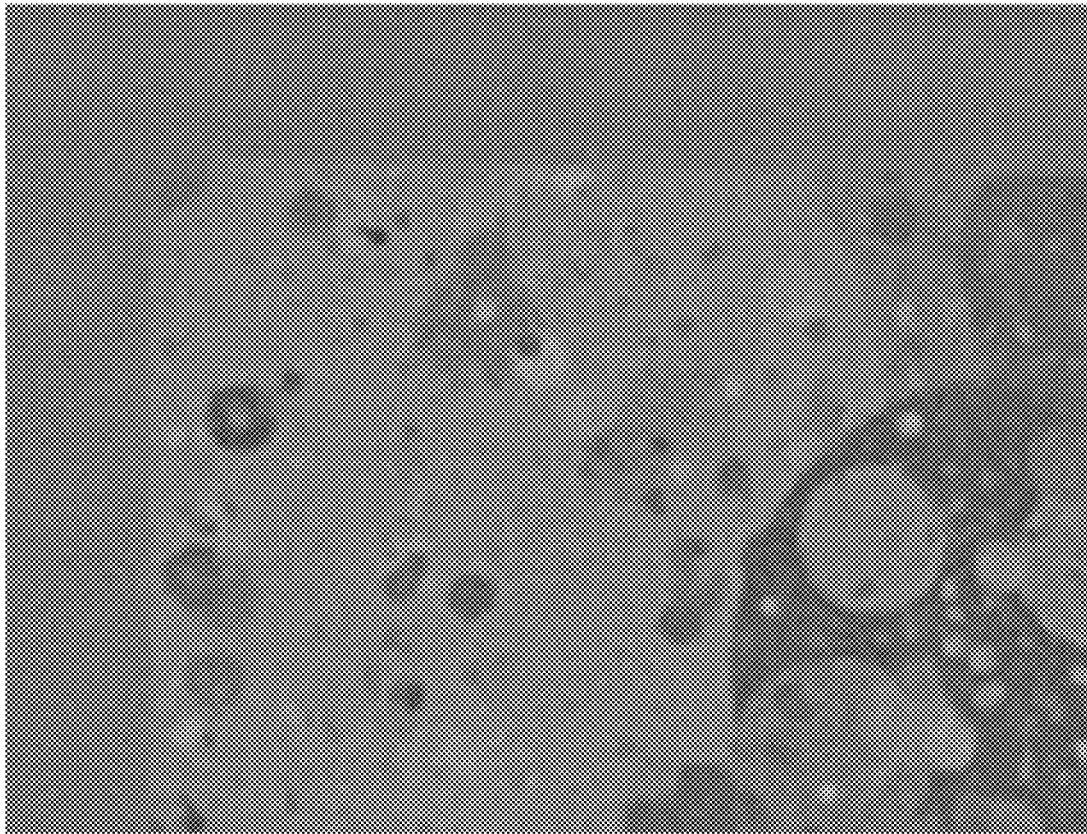

FIGS. 16A and 16B illustrate example results that may be obtained using an image processing architecture that supports multi-frame blending with intraband and interband multi-frame demosaicing and with interband denoising and interband sharpening according to this disclosure. More specifically, FIG. 16A illustrates an example image 1600 generated using a conventional approach, and FIG. 16B illustrates an example image 1602 generated using the image processing architecture 200.

As can be seen in FIGS. 16A and 16B, the scene being captured by the images 1600 and 1602 includes a number of painted areas on a wall or other surface, where a large number of small dots and other painted features appear in the scene. The image 1600 shown here tends to be blurrier and has more difficulty capturing edges of the painted features cleanly. In contrast, the image 1602 shown here is much clearer and shows the edges of the painted features much more clearly. Among other reasons, this is because the image processing architecture 200 can perform intraband and interband demosaicing, interband denoising, and interband sharpening as described above.

Although FIGS. 16A and 16B illustrate one example of results that may be obtained using an image processing architecture that supports multi-frame blending with intraband and interband multi-frame demosaicing and with interband denoising and interband sharpening, various changes may be made to FIGS. 16A and 16B. For example, the results shown here are merely meant to illustrate one example of the types of results that may be obtained using the approaches described in this patent document. The actual results obtained using the approaches described here can vary based on a number of factors, such as the scenes being imaged and how the functions described in this patent document are actually implemented in an electronic device 101, server 106, or other device.

Figure 17:
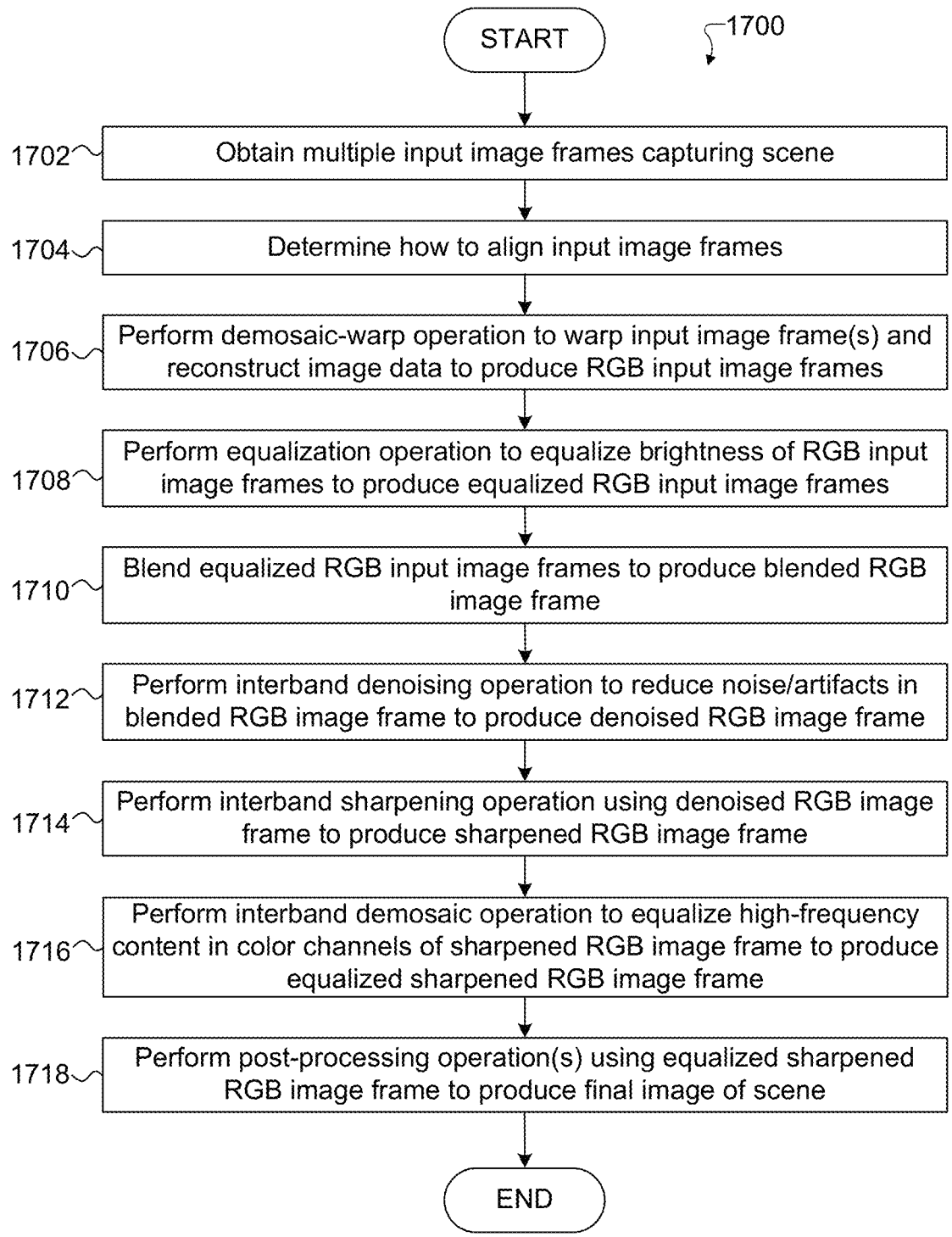
FIG. 17 illustrates an example method for multi-frame blending with intraband and interband multi-frame demosaicing and with interband denoising and interband sharpening according to this disclosure.

FIG. 17 illustrates an example method 1700 for multi-frame blending with intraband and interband multi-frame demosaicing and with interband denoising and interband sharpening according to this disclosure. For ease of explanation, the method 1700 is described as being performed by the electronic device 101 of FIG. 1 using the image processing architecture 200 of FIG. 2. However, the method 1700 may be performed using any other suitable device in any other suitable system, such as when the method 1700 is performed by the server 106.

As shown in FIG. 17, multiple image frames capturing a scene are obtained at step 1702. This may include, for example, the processor 120 obtaining multiple input image frames 202 using one or more imaging sensors 180. In some cases, two or more of the input image frames 202 may have been captured using a common exposure. Also, in some cases, two or more of the input image frames 202 may have been captured using different exposures. A determination is made how to align the input image frames at step 1704. This may include, for example, the processor 120 performing the alignment function 206 to select a reference image frame 302 and identify one or more non-reference image frames 304 from among the input image frames 202. This may also include the processor 120 performing the alignment function 206 to generate one or more alignment maps 306. Each alignment map 306 may identify how an image frame (such as a non-reference image frame 304) can be warped to more closely align one or more of its features with one or more corresponding features of at least one other image frame (such as the reference image frame 302).

A demosaic-warp operation is performed to warp one or more of the input image frames and to reconstruct image data of the input image frames in order to produce RGB input frames at step 1706. This may include, for example, the processor 120 performing the demosaic-warp function 208 in order to perform intraband joint demosaicing and warping of the input image frames 202. For instance, the processor 120 could use a kernel-adaptive approach or other approach to perform interpolations needed to fill in the red, green, and blue (and optionally white) data values in the color channels of the reference and non-reference image frames 302 and 304 in order to produce RGB input image frames 312 and 314. The processor 120 could also use bilateral interpolation filters or other filters 408-414 that can interpolate data values for the different color channels of the RGB input image frames 312 and 314.

An equalization operation is performed to equalize the brightness of the RGB input image frames in order to produce equalized RGB input image frames at step 1708. This may include, for example, the processor 120 performing the equalization function 210 to substantially equalize the brightness levels of the RGB input image frames 312 and 314 in order to produce equalized RGB input image frames. The equalized RGB input image frames are blended with one another in order to produce a blended RGB image frame at step 1710. This may include, for example, the processor 120 performing the single-exposure blending function 212 to blend multiple equalized RGB input image frames associated with a common exposure (if any) and/or performing the multi-exposure blending function 214 to blend multiple equalized RGB input image frames or blended image frames associated with different exposures (if any) in order to produce a blended RGB image frame 322.

An interband denoising operation is performed to reduce noise and artifacts in the blended RGB image frame in order to produce a denoised RGB image frame at step 1712. This may include, for example, the processor 120 performing the interband denoising function 216 to reduce noise and sampling, interpolation, and aliasing artifacts in the red, green, and blue channels of the blended RGB image frame 322. In some cases, this may be performed using guided filters for all color channels, such as when the green guided filter is self-guided or is guided using the white channel (as shown in FIG. 11). In other cases, this may be performed using guided filters for the red and blue channels, which can be guided by the filtered green channel that is output from another guided filter (as shown in FIG. 12) or from a denoising function (as shown in FIG. 13). This may be done to produce a denoised RGB image frame (represented by the outputs 1120 or 1212). An interband sharpening operation is performed to sharpen at least some of the color channels of the denoised RGB image frame at step 1714. This may include, for example, the processor 120 performing the interband sharpening function 218 to add details from the denoised green channel to the denoised red and blue channels. This may be done to produce a sharpened RGB image frame (represented by the outputs 1438).

An interband demosaic operation is performed to equalize high-frequency content in the color channels of the sharpened RGB image frame in order to produce an equalized sharpened RGB image frame at step 1716. This may include, for example, the processor 120 performing the interband demosaic function 220 to restore high-frequency content from the sharpened green channel to the sharpened red and blue channels. This may be done to produce an equalized sharpened RGB image frame (represented by the denoised green channel and the outputs 1516 representing equalized sharpened red and blue channels).

One or more post-processing operations may be performed using the equalized sharpened RGB image frame to produce a final image of the scene at step 1718. This may include, for example, the processor 120 performing the tone-mapping function 222 and/or one or more other post-processing functions 224 (such as an additional noise reduction operation and/or an edge sharpening operation) to produce a final image 204 of the scene.

Although FIG. 17 illustrates one example of a method 1700 for multi-frame blending with intraband and interband multi-frame demosaicing and with interband denoising and interband sharpening, various changes may be made to FIG. 17. For example, while shown as a series of steps, various steps in FIG. 17 may overlap, occur in parallel, occur in a different order, or occur any number of times (including zero times). Also, as noted above, it is assumed here that both (i) combined intraband and interband multi-frame demosaicing and (ii) interband denoising and interband sharpening are being used together. However, the method 1700 may support one of these functionalities and not the other, so the method 1700 may omit steps 1706/1716 (and use another demosaicing technique) or omit steps 1712/1714 (and use other denoising/sharpening techniques).

Figure 18:
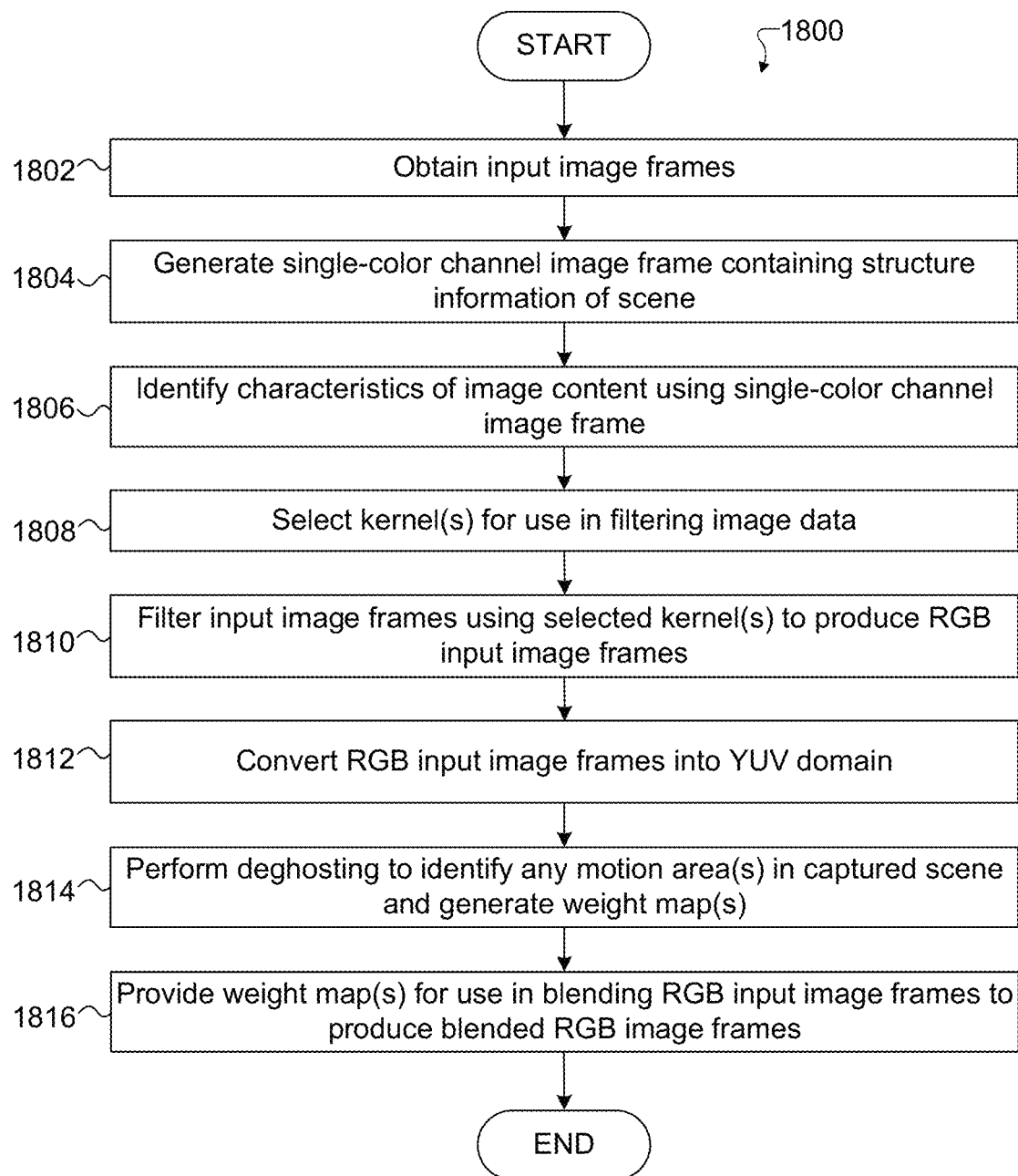
FIG. 18 illustrates an example method for intraband demosaicing according to this disclosure.

FIG. 18 illustrates an example method 1800 for intraband demosaicing according to this disclosure. For ease of explanation, the method 1800 is described as being performed by the electronic device 101 of FIG. 1 using the image processing architecture 200 of FIG. 2. However, the method 1800 may be performed using any other suitable device in any other suitable system, such as when the method 1800 is performed by the server 106.

As shown in FIG. 18, multiple input image frames are obtained at step 1802. This may include, for example, the processor 120 providing a reference image frame 302 and one or more non-reference image frames 304 to the demosaic-warp function 208. The processor 120 generally operates to perform a warp and interpolation function 308, 310 for each of the image frames 302 and 304 in order to warp one or more of the image frames 302 and 304 and to perform interpolations used to reconstruct full-size color channels for the image frames 302 and 304. In this example, a single-color channel image frame containing structure information associated with the scene being imaged is generated at step 1804. This may include, for example, the processor 120 performing the W-guided image structure generation function 402 to generate a one-channel image showing the structural contents of the image frame 302. One or more characteristics of the structure information associated with the scene being imaged are identified using the single-color channel image frame at step 1806. This may include, for example, the processor 120 performing the gradient structure tensor function 404 to identify gradients in the single-color channel image frame and identify gradient strength, coherency, and orientation estimates for each pixel of the single-color channel image frame. One or more kernels are selected for use in filtering image data using the one or more characteristics at step 1808. This may include, for example, the processor 120 performing the kernel selection function 406 to select one or more kernels 702 from a kernel bank 700 based on the gradient strength, coherency, and orientation estimates. The image frames are filtered using the selected kernel(s) at step 1810. This may include, for example, the processor 120 using the selected kernel(s) 702 in the filters 408-414 of the warp and interpolation functions 308, 310 to produce the outputs 416 (which include the reconstructed full-size color channels of the RGB input image frames 312, 314).

The RGB input image frames are converted to the YUV domain at step 1812, and deghosting is performed to identify any motion area(s) in the captured scene and to generate one or more weight maps at step 1814. This may include, for example, the processor 120 converting the RGB data of the RGB input image frames 312 and 314 into YUV data and providing the YUV data to the deghosting function 316. This may also include the processor 120 performing the deghosting function 316 to identify any regions of the RGB input image frames 312 and 314 that differ from each other, such as by a threshold amount or percentage (which can be indicative of motion). The one or more weight maps are provided for use in blending the RGB input image frames to produce a blended RGB image frame at step 1816. This may include, for example, the processor 120 providing at least one weight map 318 to the blending function 320 (which in some cases may represent the blending functions 212 and 214).

Although FIG. 18 illustrates one example of a method 1800 for intraband demosaicing, various changes may be made to FIG. 18. For example, while shown as a series of steps, various steps in FIG. 18 may overlap, occur in parallel, occur in a different order, or occur any number of times (including zero times).

Figure 19:
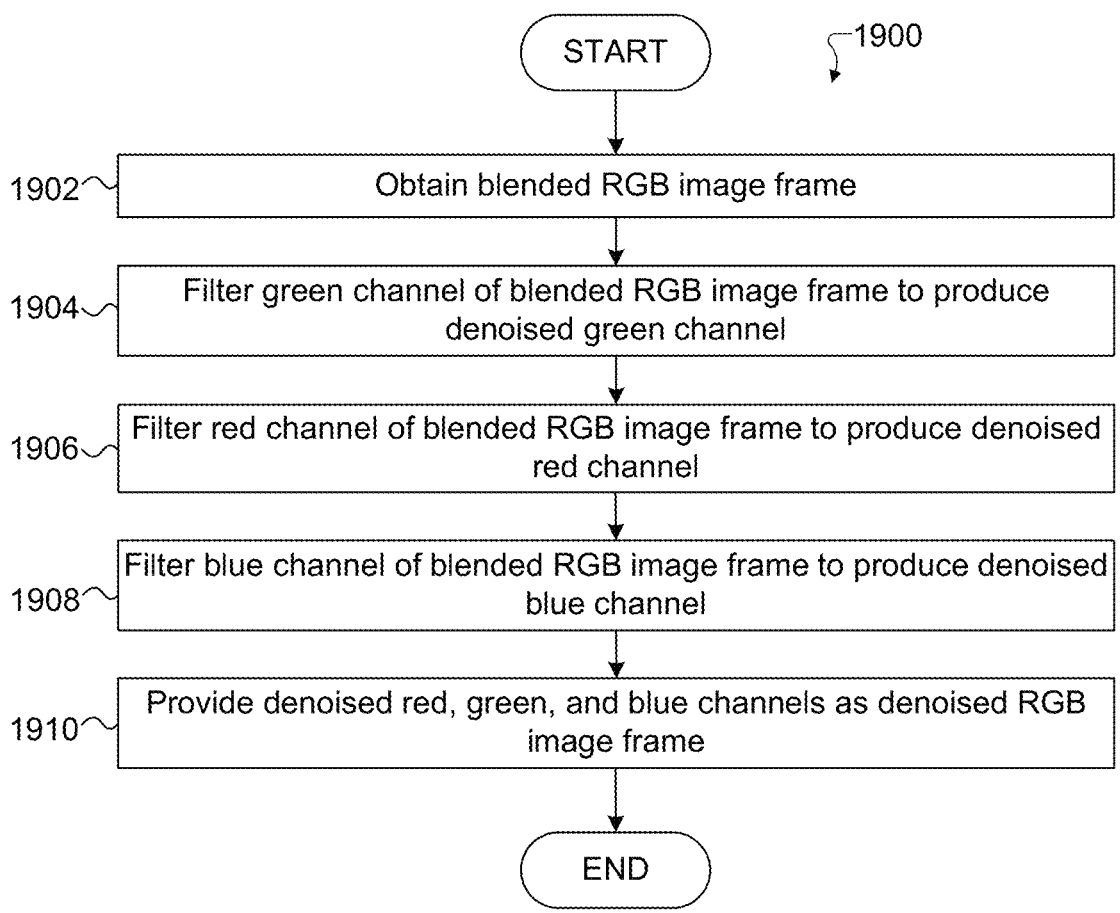
FIG. 19 illustrates an example method for interband denoising according to this disclosure.

FIG. 19 illustrates an example method 1900 for interband denoising according to this disclosure. For ease of explanation, the method 1900 is described as being performed by the electronic device 101 of FIG. 1 using the image processing architecture 200 of FIG. 2. However, the method 1900 may be performed using any other suitable device in any other suitable system, such as when the method 1900 is performed by the server 106.

As shown in FIG. 19, a blended RGB image frame is obtained at step 1902. This may include, for example, the processor 120 providing a blended RGB image frame 322 to the interband denoising function 216. The green channel of the blended RGB image frame is filtered to produce a denoised green channel at step 1904, the red channel of the blended RGB image frame is filtered to produce a denoised red channel at step 1906, and the blue channel of the blended RGB image frame is filtered to produce a denoised blue channel at step 1908. In some cases, this may include the processor 120 using guided filters for all color channels. In other cases, this may include the processor 120 using guided filters for the red and blue channels, which can be guided by the filtered green channel from another guided filter or from a denoising function. Note, however, that any other suitable types of filters may be used here. The denoised red, green, and blue channels are provided as a denoised RGB image frame at step 1910. This may include, for example, the processor 120 providing the outputs 1120 or 1212 representing the denoised RGB image frame to the interband sharpening function 218.

Although FIG. 19 illustrates one example of a method 1900 for interband denoising, various changes may be made to FIG. 19. For example, while shown as a series of steps, various steps in FIG. 19 may overlap, occur in parallel, occur in a different order, or occur any number of times (including zero times).

Figure 20:
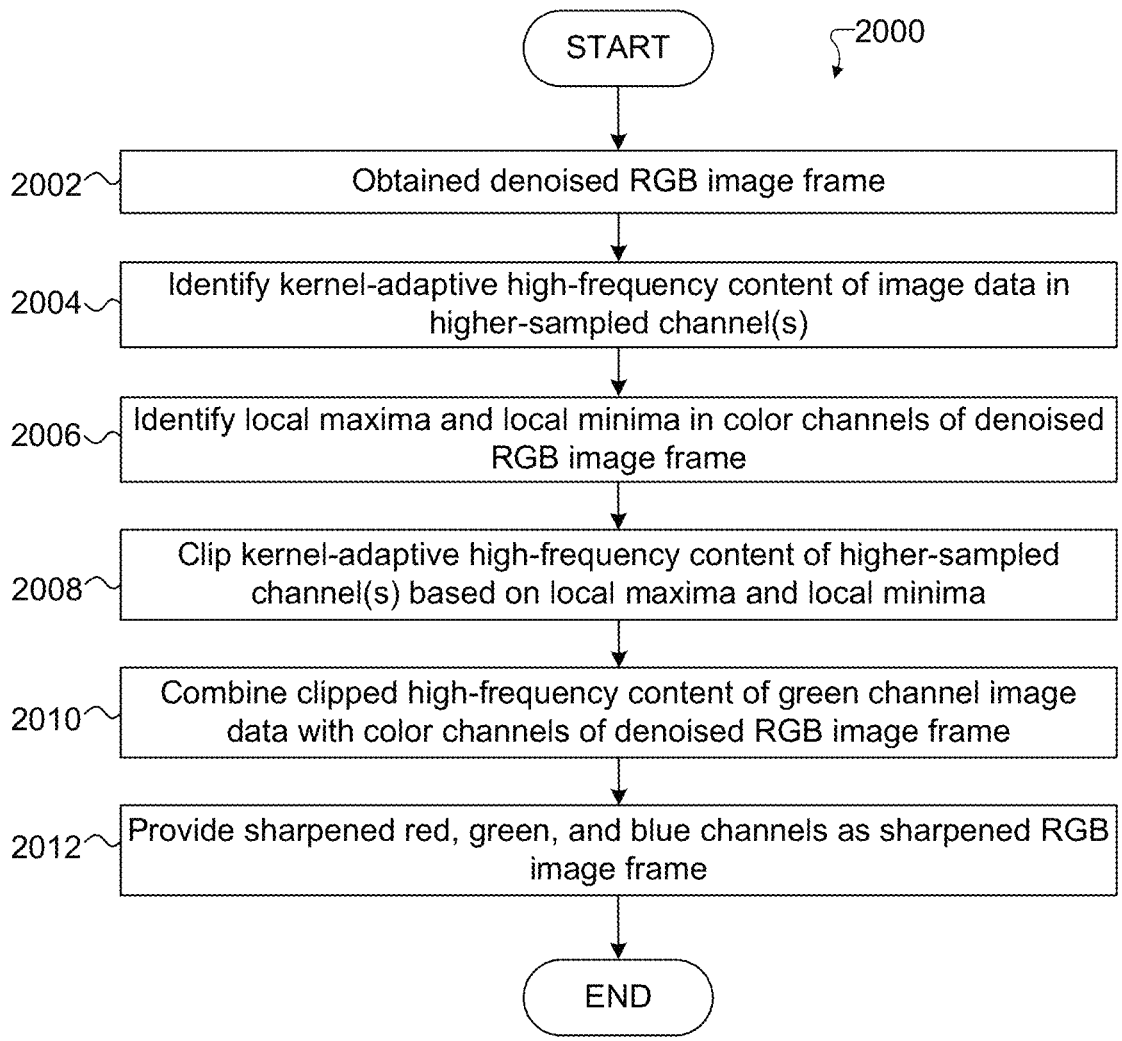
FIG. 20 illustrates an example method for interband sharpening according to this disclosure.

FIG. 20 illustrates an example method 2000 for interband sharpening according to this disclosure. For ease of explanation, the method 2000 is described as being performed by the electronic device 101 of FIG. 1 using the image processing architecture 200 of FIG. 2. However, the method 2000 may be performed using any other suitable device in any other suitable system, such as when the method 2000 is performed by the server 106.

As shown in FIG. 20, a denoised RGB image frame is obtained at step 2002. This may include, for example, the processor 120 providing a denoised RGB image frame generated by the interband denoising function 216 to the interband sharpening function 218. Kernel-adaptive high-frequency content of image data in one or more higher-sampled color channels is identified at step 2004. This may include, for example, the processor 120 performing the functions 1402, 1406, 1410 to generate a signal 1412 identifying the high-frequency content of the white and green channels (or just one of these channels) as output from the warp and interpolation function 308, 310. This may also include the processor 120 performing the coring function 1414 to suppress noisy components in the signal 1412. One or more local maxima and one or more local minima are identified in the denoised red, green, and blue channels of the denoised RGB image frame at step 2006. This may include, for example, the processor 120 performing the functions 1418 and 1420 to identify the one or more local maxima and one or more local minima.

The kernel-adaptive high-frequency content of the image data in the one or more higher-sampled color channels is clipped based on the one or more local maxima and the one or more local minima at step 2008. This may include, for example, the processor 120 performing the functions 1422-1430 to limit the amount of high-pass overshoot around strong edges in the denoised red, green, and blue channels of the denoised RGB image frame. The clipped kernel-adaptive high-frequency content of the image data in the one or more higher-sampled color channels is combined with the denoised red, green, and blue channels of the denoised RGB image frame at step 2010. This can help to reintroduce high-pass details into the denoised RGB image frame based on the low-pass green and/or low-pass white channel(s) in the outputs 416 (which can be generated using the adaptive kernel approach described above). The sharpened red, green, and blue channels are provided as a sharpened RGB image frame at step 2012. This may include, for example, the processor 120 providing the outputs 1438 representing the sharpened RGB image frame to the interband demosaic function 220.

Although FIG. 20 illustrates one example of a method 2000 for interband sharpening, various changes may be made to FIG. 20. For example, while shown as a series of steps, various steps in FIG. 20 may overlap, occur in parallel, occur in a different order, or occur any number of times (including zero times).

Figure 21:
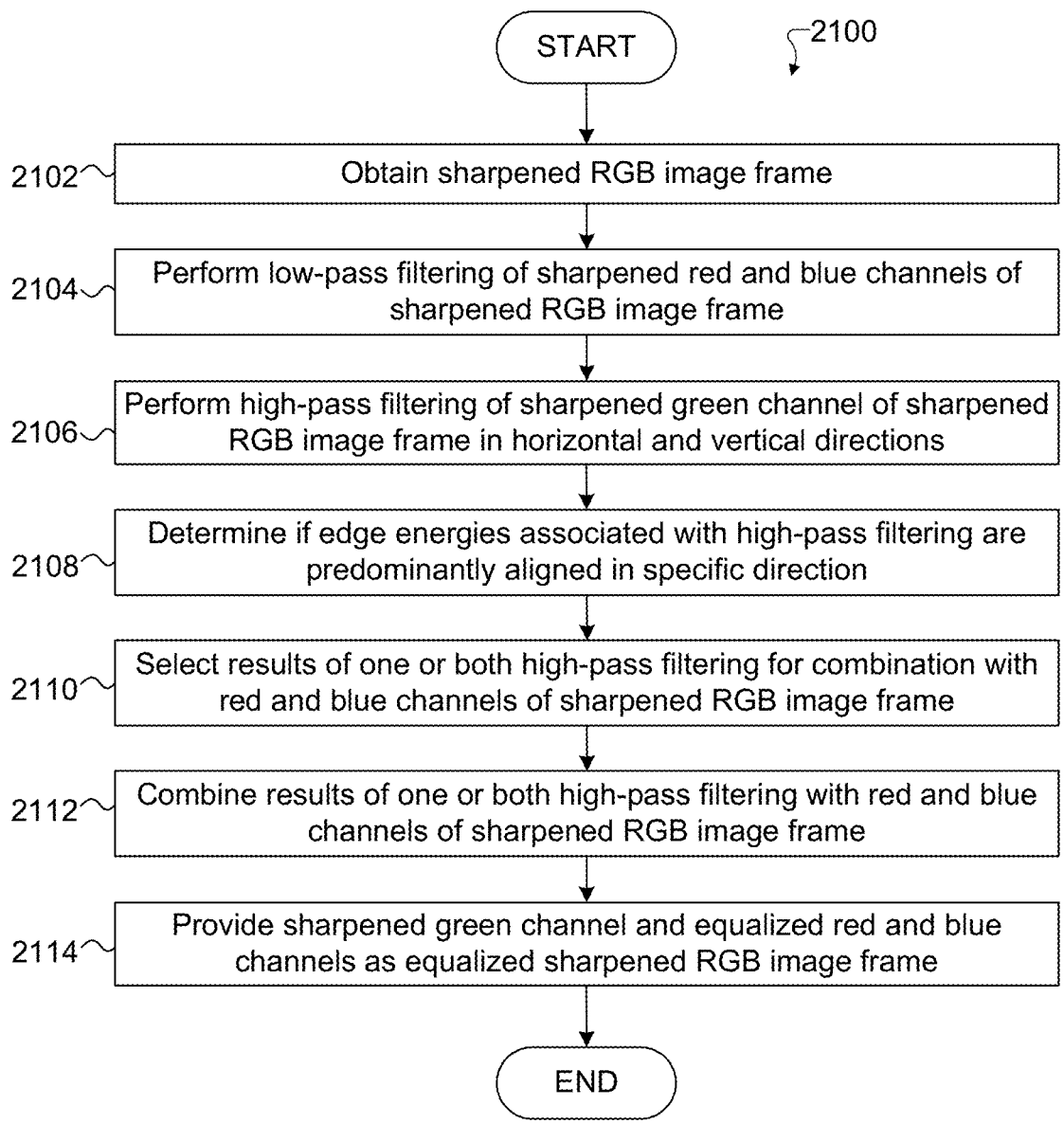
FIG. 21 illustrates an example method for interband demosaicing according to this disclosure.

FIG. 21 illustrates an example method 2100 for interband demosaicing according to this disclosure. For ease of explanation, the method 2100 is described as being performed by the electronic device 101 of FIG. 1 using the image processing architecture 200 of FIG. 2. However, the method 2100 may be performed using any other suitable device in any other suitable system, such as when the method 2100 is performed by the server 106.

As shown in FIG. 21, a sharpened RGB image frame is obtained at step 2102. This may include, for example, the processor 120 providing a sharpened RGB image frame generated by the interband sharpening function 218 to the interband demosaic function 220. Low-pass filtering of the sharpened red and blue channels of the sharpened RGB image frame is performed at step 2104, and high-pass filtering of the sharpened green channel of the sharpened RGB image frame is performed in multiple directions at step 2106. This may include, for example, the processor 120 performing the functions 1502-1508 to perform low-pass filtering of the sharpened red and blue channels of the sharpened RGB image frame and to perform high-pass filtering of the sharpened green channel of the sharpened RGB image frame in the horizontal and vertical directions.

A determination is made if edge energies as represented by the high-pass filters' outputs indicate that the edges in the scene being imaged are aligned in a specified direction (horizontally or vertically) at step 2108. This may include, for example, the processor 120 performing the direction selection/combination function 1510 to determine if one of the edge energies is larger than the other and if the larger edge energy exceeds a threshold. One or both of the high-pass filters' outputs are selected for combination with the sharpened red and blue channels of the sharpened RGB image frame at step 2110. This may include, for example, the processor 120 performing the direction selection/combination function 1510 to select (i) one of the high-pass filters' outputs if the edges in the scene are aligned in a specified direction or (ii) a combination of both high-pass filters' outputs if the edges in the scene are not aligned in a specified direction.

The outputs of the selected high-pass filter(s) are combined with the sharpened red and blue channels of the sharpened RGB image frame at step 2112. This may include, for example, the processor 120 performing the functions 1512 and 1514 to combine the outputs of the selected high-pass filter(s) with the sharpened red and blue channels. As a particular example, the processor 120 may add the outputs of the selected high-pass filter(s) to the sharpened red channel to produce an equalized sharpened red channel and subtract the outputs of the selected high-pass filter(s) from the sharpened blue channel to produce an equalized sharpened blue channel. The sharpened green channel and the equalized sharpened red and blue channels are provided as an equalized sharpened RGB image frame at step 2114. This may include, for example, the processor 120 providing the sharpened green channel and the outputs 1516 to the tone-mapping function 222 and/or the one or more other post-processing functions 224.

Although FIG. 21 illustrates one example of a method 2100 for interband demosaicing, various changes may be made to FIG. 21. For example, while shown as a series of steps, various steps in FIG. 21 may overlap, occur in parallel, occur in a different order, or occur any number of times (including zero times).

Note that the functionalities described above may find use in a number of image processing applications, such as various applications in which multiple image frames are blended. One example application noted above is a digital zoom use case where images are captured while a digital zoom feature is being used, in which case a set of Bayer image frames or other image frames can be blended with improved quality. Other example image processing applications that may use the functionalities described above may include low-light noise reduction (where noise created by low-light conditions can be reduced), "night mode" operation (where image frames of dark scenes are captured), and HDR image generation (where image frames of different exposures are blended). All of these applications and other image processing applications where multiple image frames are blended can benefit from multi-frame blending along with the functionalities described above. Also note that while described as being used to produce images of scenes, the same or similar approaches may be used to produce sequences of images, such as in a video stream.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
 obtaining a blended red-green-blue (RGB) image frame of a scene; and
 performing, using at least one processing device of an electronic device, an interband denoising operation to remove at least one of noise and one or more artifacts from the blended RGB image frame in order to produce a denoised RGB image frame;
 wherein performing the interband denoising operation comprises performing filtering of red, green, and blue color channels of the blended RGB image frame to remove at least one of the noise and the one or more artifacts from the blended RGB image frame;
wherein the filtering of the green color channel of the blended RGB image frame produces a denoised green color channel; and
wherein the filtering of the red and blue color channels of the blended RGB image frame is based on image data of the denoised green color channel.

2. The method of claim 1, wherein performing the filtering of the red, green, and blue color channels of the blended RGB image frame comprises:
filtering the green color channel of the blended RGB image frame using a first filter;
filtering the red color channel of the blended RGB image frame using a second filter; and
filtering the blue color channel of the blended RGB image frame using a third filter.

3. The method of claim 2, wherein:
the first filter comprises a first guided filter configured to filter the green color channel of the blended RGB image frame while guided by one of: (i) a green-white channel based on the green color channel and a white color channel of the blended RGB image frame or (i) the green color channel of the blended RGB image frame;
the second filter comprises a second guided filter configured to filter the red color channel of the blended RGB image frame while guided by a combination of (i) the green-white channel or the green color channel of the blended RGB image frame, (ii) the red color channel of the blended RGB image frame, and (iii) the blue color channel of the blended RGB image frame; and
the third filter comprises a third guided filter configured to filter the blue color channel of the blended RGB image frame while guided by the combination of (i) the green-white channel or the green color channel of the blended RGB image frame, (ii) the red color channel of the blended RGB image frame, and (iii) the blue color channel of the blended RGB image frame.

4. The method of claim 2, wherein:
the first filter comprises a first guided filter configured to filter the green color channel of the blended RGB image frame while guided by the green color channel of the blended RGB image frame, the first guided filter configured to generate the denoised green color channel;
the second filter comprises a second guided filter configured to filter the red color channel of the blended RGB image frame while guided by a combination of the red color channel of the blended RGB image frame and the denoised green color channel; and
the third filter comprises a third guided filter configured to filter the blue color channel of the blended RGB image frame while guided by a combination of the blue color channel of the blended RGB image frame and the denoised green color channel.

5. The method of claim 1, wherein performing the filtering of the red, green, and blue color channels of the blended RGB image frame comprises:
filtering the green color channel of the blended RGB image frame using a green-channel denoising function;
filtering the red color channel of the blended RGB image frame using a first filter; and
filtering the blue color channel of the blended RGB image frame using a second filter.

6. The method of claim 5, wherein:
the green-channel denoising function produces the denoised green color channel;
the first filter comprises a first guided filter configured to filter the red color channel of the blended RGB image frame while guided by a combination of the red color channel of the blended RGB image frame and the denoised green color channel; and
the second filter comprises a second guided filter configured to filter the blue color channel of the blended RGB image frame while guided by a combination of the blue color channel of the blended RGB image frame and the denoised green color channel.

7. The method of claim 1, further comprising:
performing an interband sharpening operation to sharpen different color channels of the denoised RGB image frame in order to produce a sharpened RGB image frame.

8. The method of claim 7, wherein performing the interband sharpening operation comprises:
identifying high-frequency contents of at least one of a green color channel and a white color channel of a reference image frame;
clipping the identified high-frequency contents based on one or more local maxima and one or more local minima in the different color channels of the denoised RGB image frame; and
combining the clipped high-frequency contents with the different color channels of the denoised RGB image frame in order to produce the sharpened RGB image frame.

9. The method of claim 1, wherein the blended RGB image frame comprises an image frame generated using multiple input image frames that have been subjected to an intraband joint demosaic-warp operation.

10. The method of claim 1, wherein the filtering of the green channel is based on image data of a white color channel.

11. The method of claim 1, further comprising:
equalizing a brightness level of a white color channel compared to the green color channel to produce an equalized white color channel;
wherein the filtering of the green color channel is based on the equalized white color channel.

12. An electronic device comprising:
at least one processing device configured to:
obtain a blended red-green-blue (RGB) image frame of a scene;
perform an interband denoising operation to remove at least one of noise and one or more artifacts from the blended RGB image frame in order to produce a denoised RGB image frame; and
perform an interband sharpening operation to sharpen different color channels of the denoised RGB image frame in order to produce a sharpened RGB image frame;
wherein, to perform the interband denoising operation, the at least one processing device is configured to perform filtering of red, green, and blue color channels of the blended RGB image frame to remove at least one of the noise and the one or more artifacts from the blended RGB image frame;
wherein the at least one processing device is configured to perform the filtering of the red and blue color channels of the blended RGB image frame based on image data of at least one of the green color channel and a white color channel of the blended RGB image frame; and wherein, to perform the interband sharpening operation, the at least one processing device is configured to:
  identify high-frequency contents of at least one of a green color channel and a white color channel of a reference image frame;
  clip the identified high-frequency contents based on one or more local maxima and one or more local minima in the different color channels of the denoised RGB image frame; and
  combine the clipped high-frequency contents with the different color channels of the denoised RGB image frame in order to produce the sharpened RGB image frame.

13. The electronic device of claim 12, wherein, to perform the filtering of the red, green, and blue color channels of the blended RGB image frame, the at least one processing device is configured to:
  filter the green color channel of the blended RGB image frame using a first filter;
  filter the red color channel of the blended RGB image frame using a second filter; and
  filter the blue color channel of the blended RGB image frame using a third filter.

14. The electronic device of claim 13, wherein:
  the first filter comprises a first guided filter configured to filter the green color channel of the blended RGB image frame while guided by one of: (i) a green-white channel based on the green and white color channels of the blended RGB image frame or (i) the green color channel of the blended RGB image frame;
  the second filter comprises a second guided filter configured to filter the red color channel of the blended RGB image frame while guided by a combination of (i) the green-white channel or the green color channel of the blended RGB image frame, (ii) the red color channel of the blended RGB image frame, and (iii) the blue color channel of the blended RGB image frame; and
  the third filter comprises a third guided filter configured to filter the blue color channel of the blended RGB image frame while guided by the combination of (i) the green-white channel or the green color channel of the blended RGB image frame, (ii) the red color channel of the blended RGB image frame, and (iii) the blue color channel of the blended RGB image frame.

15. The electronic device of claim 13, wherein:
  the first filter comprises a first guided filter configured to filter the green color channel of the blended RGB image frame while guided by the green color channel of the blended RGB image frame, the first guided filter configured to generate a denoised green color channel;
  the second filter comprises a second guided filter configured to filter the red color channel of the blended RGB image frame while guided by a combination of the red color channel of the blended RGB image frame and the denoised green color channel; and
  the third filter comprises a third guided filter configured to filter the blue color channel of the blended RGB image frame while guided by a combination of the blue color channel of the blended RGB image frame and the denoised green color channel.

16. The electronic device of claim 12, wherein, to perform the filtering of the red, green, and blue color channels of the blended RGB image frame, the at least one processing device is configured to:
  filter the green color channel of the blended RGB image frame using a green-channel denoising function;
  filter the red color channel of the blended RGB image frame using a first filter; and
  filter the blue color channel of the blended RGB image frame using a second filter.

17. The electronic device of claim 16, wherein:
  the green-channel denoising function is configured to produce a denoised green color channel;
  the first filter comprises a first guided filter configured to filter the red color channel of the blended RGB image frame while guided by a combination of the red color channel of the blended RGB image frame and the denoised green color channel; and
  the second filter comprises a second guided filter configured to filter the blue color channel of the blended RGB image frame while guided by a combination of the blue color channel of the blended RGB image frame and the denoised green color channel.

18. The electronic device of claim 12, wherein the blended RGB image frame comprises an image frame generated using multiple input image frames that have been subjected to an intraband joint demosaic-warp operation.

19. A method comprising:
  obtaining a blended red-green-blue (RGB) image frame of a scene; and
  performing, using at least one processing device of an electronic device, an interband sharpening operation to individually sharpen different color channels of the blended RGB image frame in order to produce a sharpened RGB image frame;
  wherein performing the interband sharpening operation comprises using high-pass information associated with at least one of a green color channel and a white color channel of a reference image frame used in a blending operation to produce the blended RGB image frame.

20. The method of claim 19, wherein performing the interband sharpening operation comprises:
  identifying high-frequency contents of at least one of the green color channel and the white color channel of the reference image frame;
  clipping the identified high-frequency contents based on one or more local maxima and one or more local minima in the different color channels of the blended RGB image frame; and
  combining the clipped high-frequency contents with the different color channels of the blended RGB image frame in order to produce the sharpened RGB image frame.

* * * * *